(12) United States Patent
Alalao

(10) Patent No.: US 11,472,291 B2
(45) Date of Patent: Oct. 18, 2022

(54) GRAPHICAL USER INTERFACE FOR DISPLAY OF AUTONOMOUS VEHICLE BEHAVIORS

(71) Applicant: Motional AD LLC, Boston, MA (US)

(72) Inventor: Ayman Alalao, Cambridge, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/855,954

(22) Filed: Apr. 22, 2020

(65) Prior Publication Data
US 2020/0338983 A1    Oct. 29, 2020

Related U.S. Application Data

(60) Provisional application No. 62/838,359, filed on Apr. 25, 2019.

(51) Int. Cl.
*B60K 35/00*    (2006.01)

(52) U.S. Cl.
CPC .......... *B60K 35/00* (2013.01); *B60K 2370/11* (2019.05); *B60K 2370/152* (2019.05); *B60K 2370/166* (2019.05); *B60K 2370/175* (2019.05); *B60K 2370/178* (2019.05)

(58) Field of Classification Search
None
See application file for complete search history.

(56) References Cited

U.S. PATENT DOCUMENTS

| | | |
|---|---|---|
| 7,124,027 B1 | 10/2006 | Ernest et al. |
| 7,661,891 B2 | 2/2010 | Heibel |
| 9,971,348 B1 | 5/2018 | Canavor et al. |
| 10,007,269 B1 | 6/2018 | Gray |

(Continued)

FOREIGN PATENT DOCUMENTS

| | | |
|---|---|---|
| DE | 102011116718 | 4/2013 |
| DE | 102013213039 | 1/2015 |

(Continued)

OTHER PUBLICATIONS

Waze ("Waze App Review (in depth)", retrieved from the internet https://www.youtube.com/watch?v=PCO1RO0XLW8, Dec. 28, 2014 (Year: 2014).*

(Continued)

*Primary Examiner* — Stella Higgs
(74) *Attorney, Agent, or Firm* — Fish & Richardson P.C.

(57) ABSTRACT

Techniques are disclosed for creating and presenting a graphical user interface for display of autonomous vehicle behaviors. The techniques include determining a trajectory of a vehicle operating in a real-world environment. Sensors of the vehicle obtain sensor data representing an object in the real-world environment. A maneuver of the vehicle to avoid a collision with the object is predicted based on the sensor data and the trajectory of the vehicle. It is determined that a passenger comfort level of a passenger riding in the vehicle will decrease based on the maneuver of the vehicle. The passenger comfort level is measured by passenger sensors of the vehicle. A graphical user interface is generated including representations of the vehicle, the object, and a graphic, text, or a symbol alerting the passenger of the predicted maneuver. The graphical user interface is transmitted to a display device of the vehicle.

22 Claims, 24 Drawing Sheets

(56) References Cited

U.S. PATENT DOCUMENTS

| | | | |
|---|---|---|---|
| 10,053,088 | B1 | 8/2018 | Askeland |
| 2005/0256711 | A1 | 11/2005 | Lahti |
| 2008/0040004 | A1 | 2/2008 | Breed |
| 2009/0074249 | A1* | 3/2009 | Moed ................. G06K 9/00818 382/104 |
| 2010/0026723 | A1* | 2/2010 | Nishihara ........... G06F 3/04886 345/671 |
| 2010/0114437 | A1 | 5/2010 | Boss et al. |
| 2014/0200737 | A1 | 7/2014 | Lortz et al. |
| 2014/0200863 | A1* | 7/2014 | Kamat ................... G06T 19/00 703/1 |
| 2014/0280319 | A1* | 9/2014 | Rishe ..................... G06F 16/29 707/769 |
| 2015/0363986 | A1 | 12/2015 | Hoyos et al. |
| 2016/0350609 | A1* | 12/2016 | Mason .................. G06T 19/003 |
| 2017/0057507 | A1* | 3/2017 | Gordon ................ B60W 30/16 |
| 2017/0217445 | A1 | 8/2017 | Tzirkel-Hancock et al. |
| 2017/0267256 | A1 | 9/2017 | Minster et al. |
| 2017/0282970 | A1 | 10/2017 | Yanez |
| 2017/0349027 | A1 | 12/2017 | Goldman-Shenhar et al. |
| 2018/0086344 | A1 | 3/2018 | Zhu et al. |
| 2018/0217717 | A1* | 8/2018 | Yasuda ................. B60K 35/00 |
| 2018/0286242 | A1* | 10/2018 | Talamonti ............ B60W 30/14 |
| 2018/0297586 | A1 | 10/2018 | Kim et al. |
| 2019/0196464 | A1* | 6/2019 | Lockwood ........... G05D 1/0016 |
| 2020/0130703 | A1 | 4/2020 | Pendelton et al. |
| 2020/0219197 | A1 | 7/2020 | Fields et al. |

FOREIGN PATENT DOCUMENTS

| | | |
|---|---|---|
| DE | 102014212898 | 1/2016 |
| DE | 102017105903 | 9/2017 |
| EP | 2511149 | 10/2012 |
| JP | 2017033542 A | 2/2017 |
| WO | WO 2015134376 | 9/2015 |
| WO | WO 2018170883 | 9/2018 |

OTHER PUBLICATIONS

[No Author Listed], "SAE International Standard J3016: Taxonomy and Definitions for Terms Related to Driving Automation Systems for On-Road Moto Vehicles," SAE International, dated Sep. 2016, 30 pages.

Hasenjager et al., "Personalization in advanced driver assistance systems and autonomous vehicles: A review," 2017 IEEE 20th International Conference on Intelligent Transportation Systems (ITSC), Oct. 16, 2017, 7 pages.

U.S. Appl. No. 16/656,655, filed Oct. 18, 2019, Pendleton.

GB Notice of Allowance in United Kingdom Appln. No. GB2006064. 6, dated Jan. 31, 2022, 2 pages.

GB Office Action in United Kingdom Appln. No. GB2006064.6, dated Jun. 22, 2021, 3 pages.

GB Office Action in United Kingdom Appln. No. GB2006064.6, dated Sep. 7, 2021, 4 pages.

GB Search Report and Written Opinion in United Kingdom Appln. No. GB2006064.6, dated Jan. 15, 2021, 9 pages.

KR Notice of Allowance in Korean Appln. No. 10-2020-0050876, dated Feb. 21, 2022, 3 pages (with English translation).

KR Office Action in Korean Appln. No. 10-2020-0050876, dated Aug. 31, 2021, 18 pages (with English translation).

Response to GB Office Action in United Kingdom Appln. No. GB2006064.6, dated Aug. 23, 2021, 3 pages.

Response to GB Office Action in United Kingdom Appln. No. GB2006064.6, dated Jan. 7, 2022, 7 pages.

Response to GB Search Report and Written Opinion in United Kingdom Appln. No. GB2006064.6, dated May 12, 2021, 3 pages.

* cited by examiner

2200

Identify, using one or more processors of a vehicle operating in a real-world environment, an object based on sensor data received from one or more sensors of the vehicle
2204

Generate, using the one or more processors, a graphical user interface comprising representations of the vehicle and the object
2208

Determine, using the one or more processors, that a probability of collision of the vehicle with the object is greater than a threshold value
2212

Determine, using the one or more processors, an operating constraint for the vehicle to avoid the collision of the vehicle with the object
2216

Update, using the one or more processors, the graphical user interface to display the operating constraint
2220

Transmit, to a display device of the vehicle, the updated graphical user interface
2224

Generate, at a first time, a graphical user interface comprising geometric models of a vehicle and an object located at a first distance from the vehicle
2304

Determine, at a second time, that the object is located at a second distance from the vehicle, wherein the second time is after the first time and the second distance is smaller than the first distance
2308

Determine, using one or more processors of the vehicle, a vehicular maneuver for the vehicle to avoid a collision with the object
2312

Update, using the one or more processors, the graphical user interface such that the updated graphical user interface displays a trajectory of the vehicle corresponding to the vehicular maneuver
2316

Transmit, to a display device of the vehicle, the updated graphical user interface including the trajectory of the vehicle
2320

```
┌─────────────────────────────────────────────────────────────────┐
│ Display, on a display device of a vehicle operating in a real-  │
│ world environment, a graphical user interface comprising        │
│ representations of the vehicle and the real-world environment    │
│                             2404                                 │
└─────────────────────────────────────────────────────────────────┘
                               ↓
┌─────────────────────────────────────────────────────────────────┐
│ Determine, using one or more processors of the vehicle, whether │
│ the vehicle will perform a braking operation at a first time    │
│                             2408                                 │
└─────────────────────────────────────────────────────────────────┘
                               ↓
┌─────────────────────────────────────────────────────────────────┐
│ Responsive to determining that the vehicle will perform the      │
│ braking operation at the first time, determining, using one or   │
│ more passenger sensors of the vehicle, whether one or more       │
│ passengers are riding in the vehicle                             │
│                             2412                                 │
└─────────────────────────────────────────────────────────────────┘
                               ↓
┌─────────────────────────────────────────────────────────────────┐
│ Responsive to determining that the one or more passengers are   │
│ riding in the vehicle, transmitting at a second time before the │
│ first time, using a smart speaker, audio output informing the   │
│ one or more passengers that the vehicle will perform the         │
│ braking operation at the first time                              │
│                             2416                                 │
└─────────────────────────────────────────────────────────────────┘
                               ↓
┌─────────────────────────────────────────────────────────────────┐
│ Display, on the display device, an update to the graphical user │
│ interface, wherein the update comprises a representation of a   │
│ time difference between the second time and the first time      │
│                             2420                                 │
└─────────────────────────────────────────────────────────────────┘
```

FIG. 24

GRAPHICAL USER INTERFACE FOR DISPLAY OF AUTONOMOUS VEHICLE BEHAVIORS

CROSS-REFERENCE TO RELATED APPLICATIONS

This application claims priority to U.S. Provisional Patent Application No. 62/838,359, entitled "Graphical User Interface for Display of Autonomous Vehicle Behaviors," filed Apr. 25, 2019, the entire contents of which is incorporated herein by reference.

This application is related to, and incorporates by reference in their entirety, each of the following U.S. Patent Applications: U.S. patent application Ser. No. 16/656,655, entitled "Systems and Methods for Controlling Actuators Based on Load Characteristics and Passenger Comfort," filed Oct. 18, 2019, which claims priority to U.S. Provisional Patent Application No. 62/752,277, entitled "Systems and Methods for Controlling Actuators Based on Load Characteristics and Passenger Comfort," filed Oct. 29, 2019, and U.S. Provisional Application No. 62/806,403, entitled "Systems and Methods for Measuring and Increasing Passenger Comfort," filed Feb. 15, 2019.

TECHNICAL FIELD

This description relates generally to graphical user interfaces for automotive applications.

BACKGROUND

Autonomous vehicles promise to reduce traffic congestion and accidents, provide access to the disabled, and reduce carbon emissions. The widespread adoption of autonomous vehicles by the public, however, may be slowed due to a low level of public trust in the safety of autonomous vehicles.

SUMMARY

Techniques are disclosed for creating and presenting a graphical user interface for display of autonomous vehicle behaviors. The techniques include using one or more processors of a vehicle operating in a real-world environment to determine a trajectory of the vehicle in the real-world environment. One or more sensors of the vehicle are used to obtain sensor data representing an object in the real-world environment. The one or more processors are used to predict a maneuver of the vehicle to avoid a collision with the object based on the sensor data and the trajectory of the vehicle. The one or more processors are used to determine that a passenger comfort level of a passenger riding in the vehicle will decrease based on the maneuver of the vehicle. The passenger comfort level is measured by one or more passenger sensors of the vehicle. The one or more processors are used to generate a graphical user interface including representations of the vehicle, the object, and a graphic, text, or a symbol alerting the passenger of the predicted maneuver. The graphical user interface is transmitted to a display device of the vehicle.

In some embodiments, one or more processors of a vehicle operating in a real-world environment are used to identify an object based on sensor data received from one or more sensors of the vehicle. The one or more processors are used to generate a graphical user interface including representations of the vehicle and the object. The one or more processors are used to determine that a probability of collision of the vehicle with the object is greater than a threshold value. The one or more processors are used to determine an operating constraint for the vehicle to avoid the collision of the vehicle with the object. The one or more processors are used to update the graphical user interface to display the operating constraint. The updated graphical user interface is transmitted to a display device of the vehicle.

In some embodiments, a graphical user interface is generated at a first time. The graphical user interface includes geometric models of a vehicle and an object located at a first distance from the vehicle. At a second time, it is determined that the object is located at a second distance from the vehicle. The second time is after the first time and the second distance is smaller than the first distance. One or more processors of the vehicle are used to determine a vehicular maneuver for the vehicle to avoid a collision with the object. The one or more processors are used to update the graphical user interface such that the updated graphical user interface displays a trajectory of the vehicle corresponding to the vehicular maneuver. The updated graphical user interface including the trajectory of the vehicle is transmitted to a display device of the vehicle.

In some embodiments, a graphical user interface is displayed on a display device of a vehicle operating in a real-world environment. The graphical user interface includes representations of the vehicle and the real-world environment. One or more processors of the vehicle are used to determine whether the vehicle will perform a braking operation at a first time. Responsive to determining that the vehicle will perform the braking operation at the first time, one or more passenger sensors of the vehicle are used to determine whether one or more passengers are riding in the vehicle. Responsive to determining that the one or more passengers are riding in the vehicle, audio output is transmitted using a smart speaker at a second time before the first time, The audio output informs the one or more passengers that the vehicle will perform the braking operation at the first time. An update to the graphical user interface is displayed on the display device. The update includes a representation of a time difference between the second time and the first time.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIGS. 21-24 illustrate processes for generating graphical user interfaces that display autonomous vehicle behaviors, in accordance with one or more embodiments.

DETAILED DESCRIPTION

Figure 1:
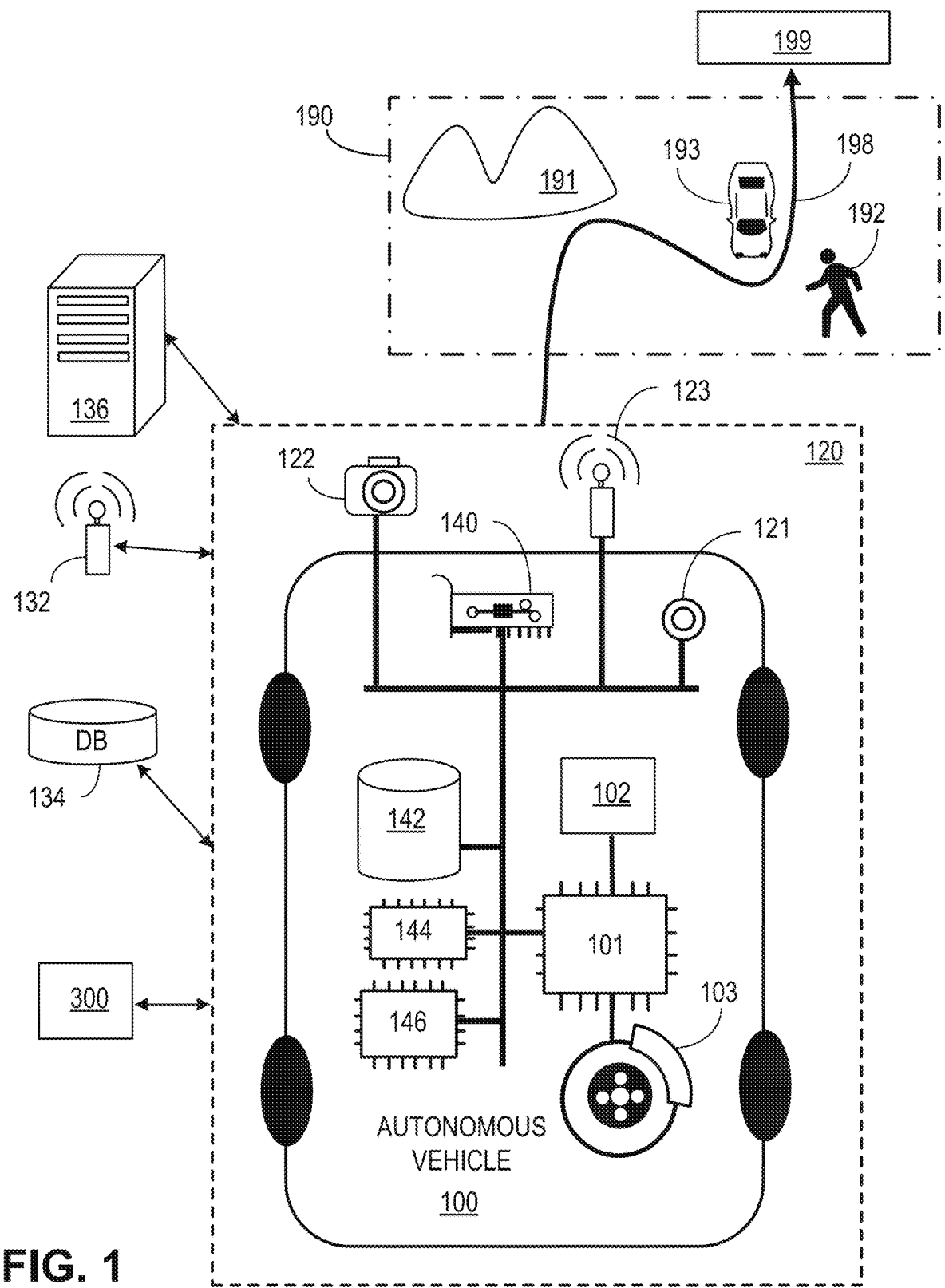
FIG. 1 shows an example of an autonomous vehicle (AV) having autonomous capability, in accordance with one or more embodiments.

In the following description, for the purposes of explanation, numerous specific details are set forth in order to provide a thorough understanding of the present embodiments. It will be apparent, however, that the present embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Operating Environment for Autonomous Vehicles
8. Example Display Devices for Autonomous Vehicles
9. Example Graphical User Interfaces for Autonomous Vehicles
10. Processes for Generating Graphical User Interfaces That Display Autonomous Vehicle Behaviors General Overview An autonomous vehicle (AV) uses onboard sensors to detect objects and determine distances to the objects while navigating within a real-world environment. A display device of the AV can be used to display a graphical user interface. The graphical user interface includes representations of the AV and the real-world environment. For example, the representation of the real-world environment can include objects such as travel lanes, traffic lights, construction zones, other vehicles, pedestrians, cyclists, etc. A predicted maneuver of the AV to avoid a collision with an object can be displayed on the graphical user interface. For example, before the AV performs a braking operation, the display device can be used to provide an advance warning to a passenger riding in the AV that the AV will perform the braking operation. Thus, the passenger can prepare for the braking operation by securing belongings or holding onto an armrest. Display of predicted maneuvers and other objects increases the passenger comfort level and provides the passenger with a greater sense of trust in the AV.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, partially autonomous, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are Global Navigation Satellite Systems (GNSSs) and inertial measurement units (IMUs) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
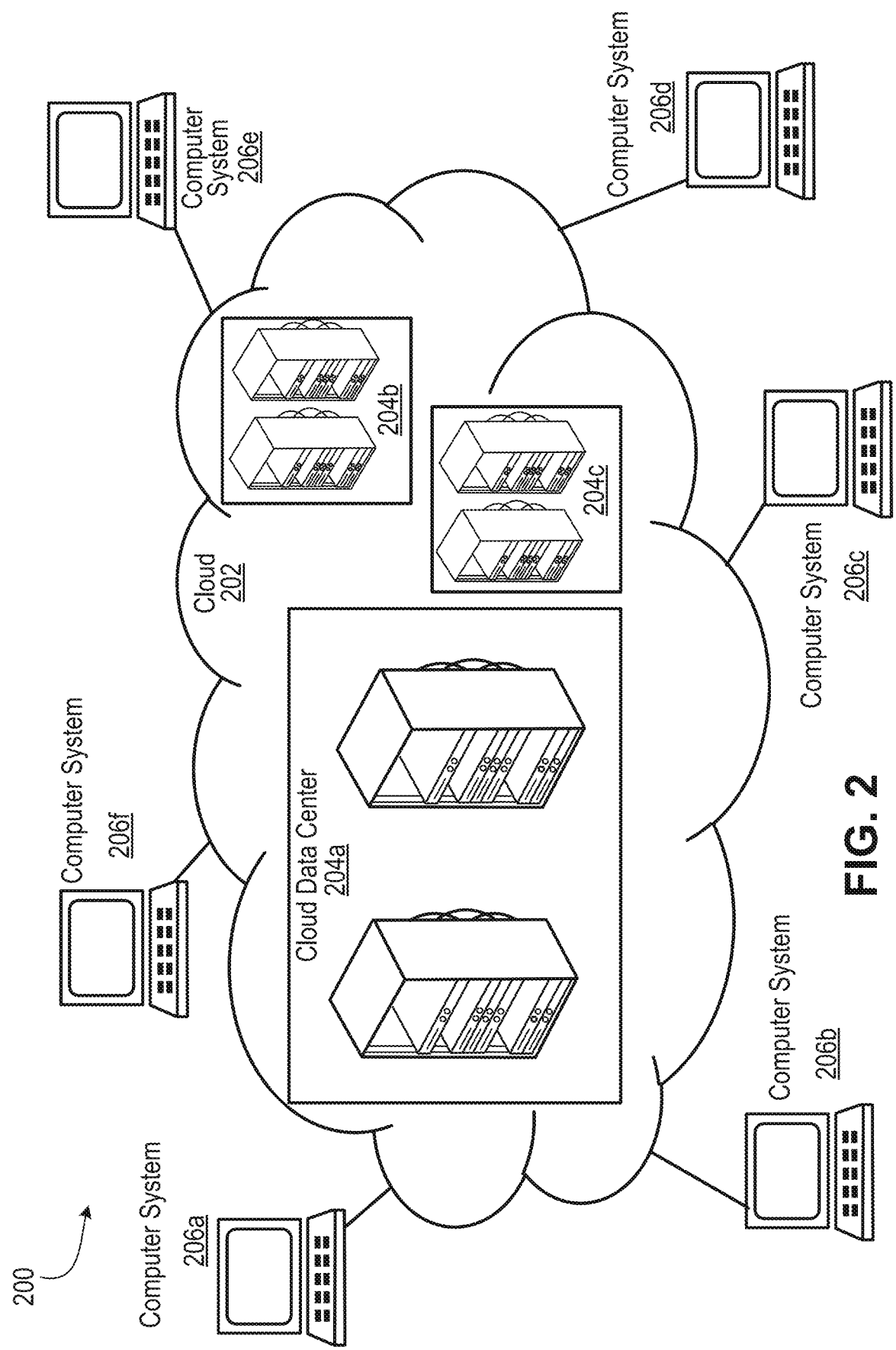
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
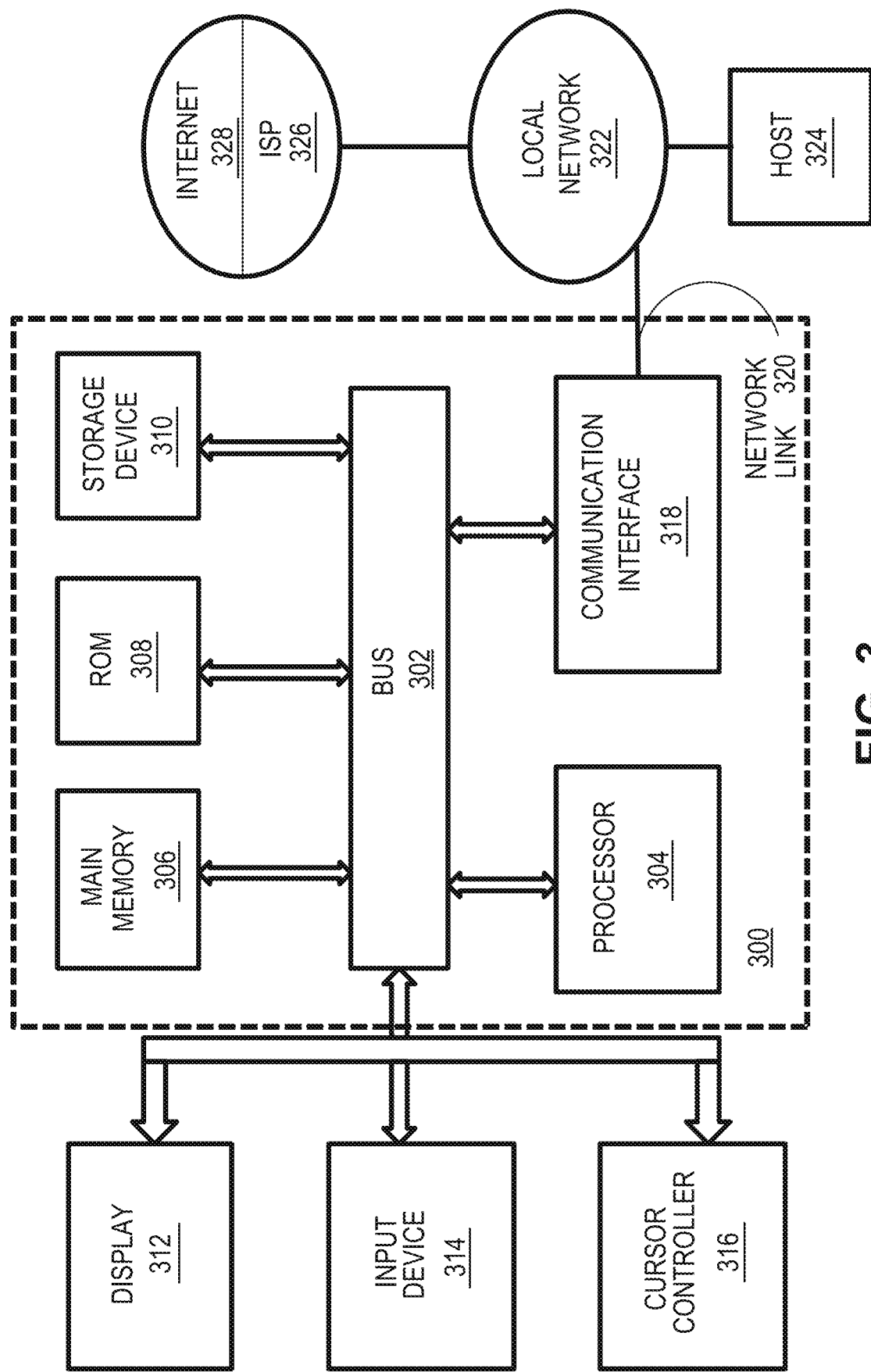
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
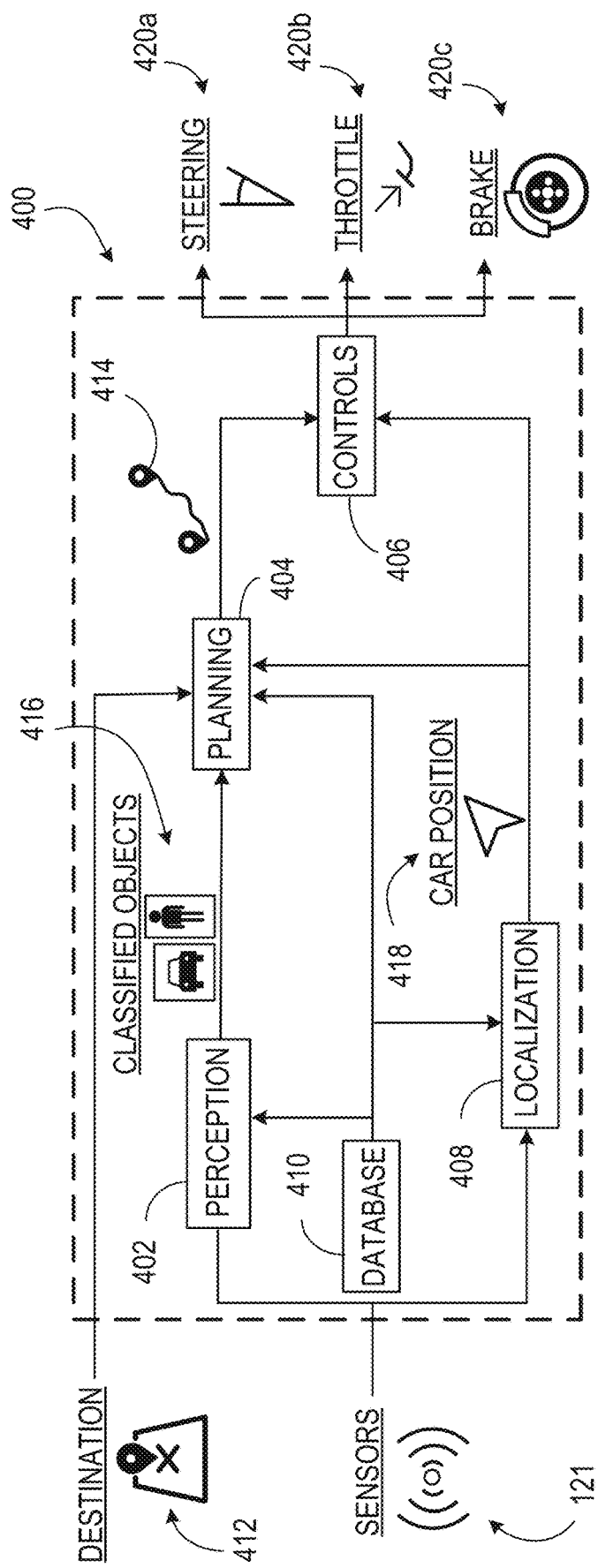
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
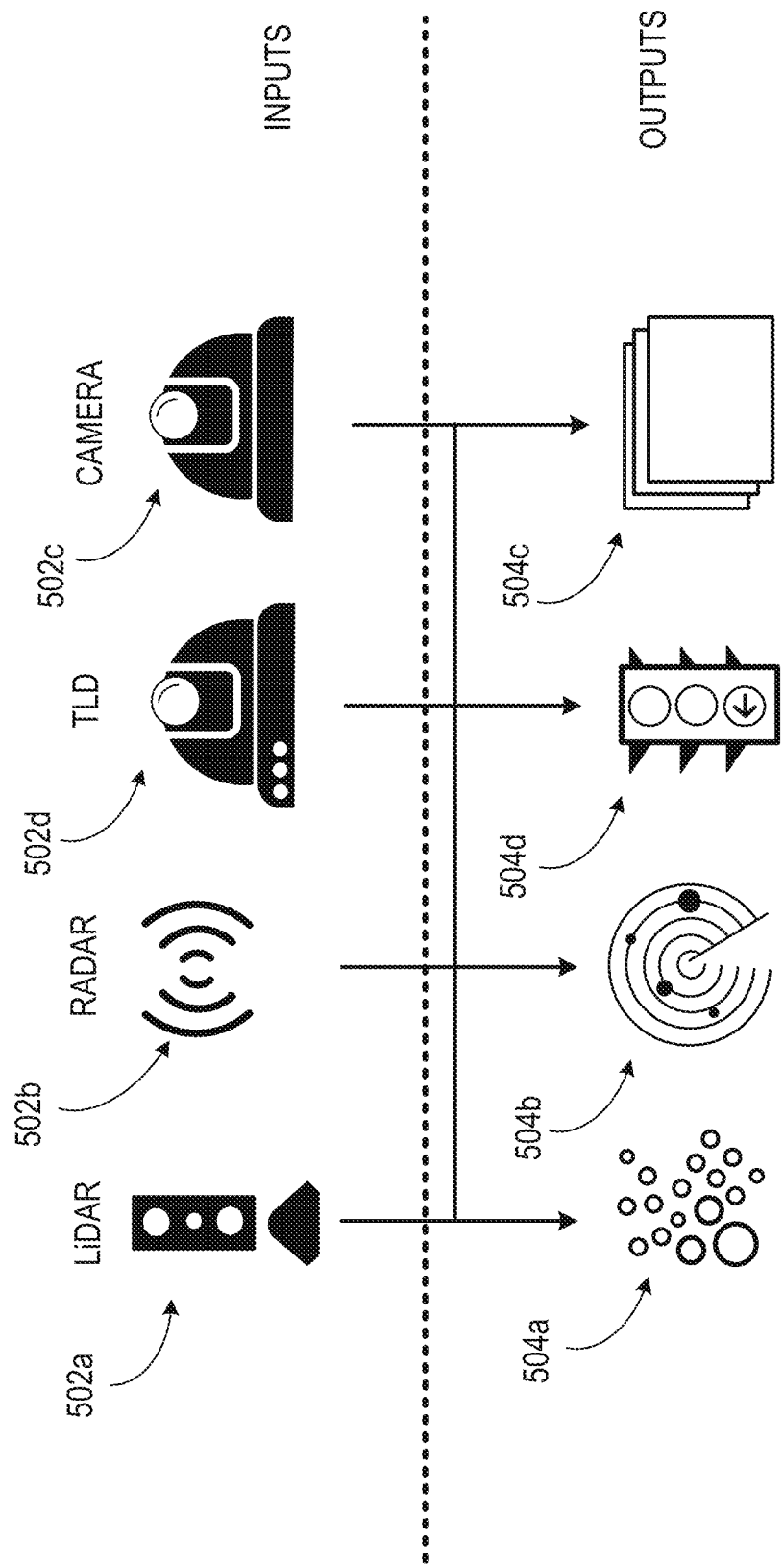
FIG. 5 shows an example of inputs and outputs that may be used by a perception module, in accordance with one or more embodiments.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
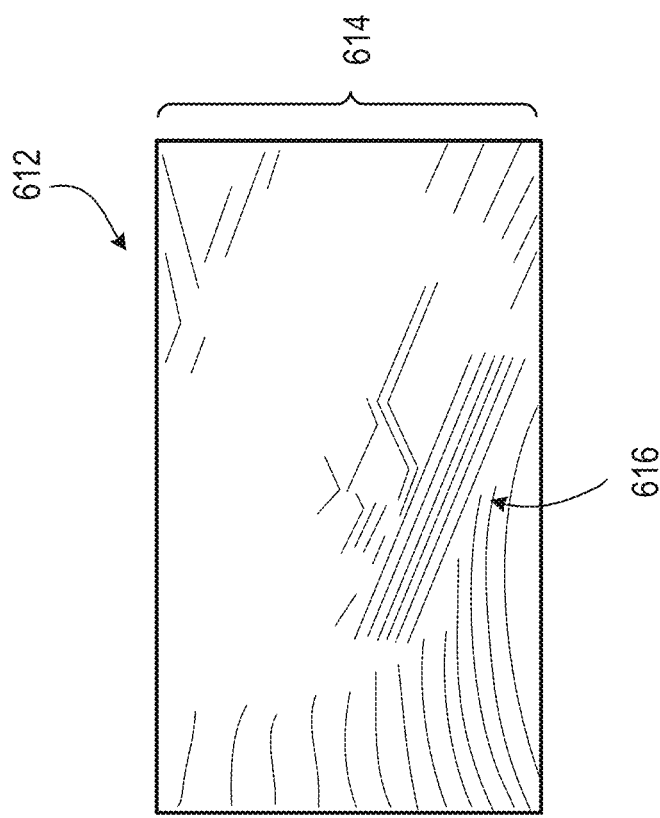
FIG. 6 shows an example of a LiDAR system, in accordance with one or more embodiments.
Figure 6:
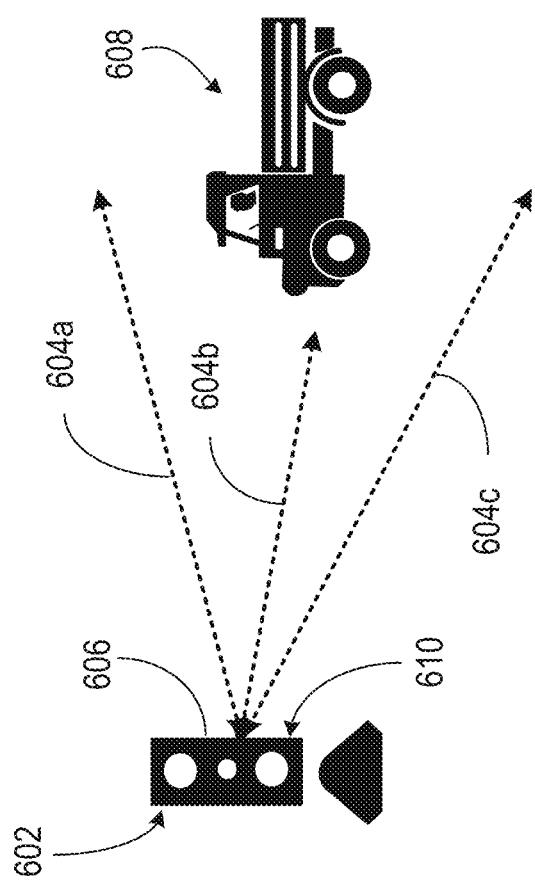

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
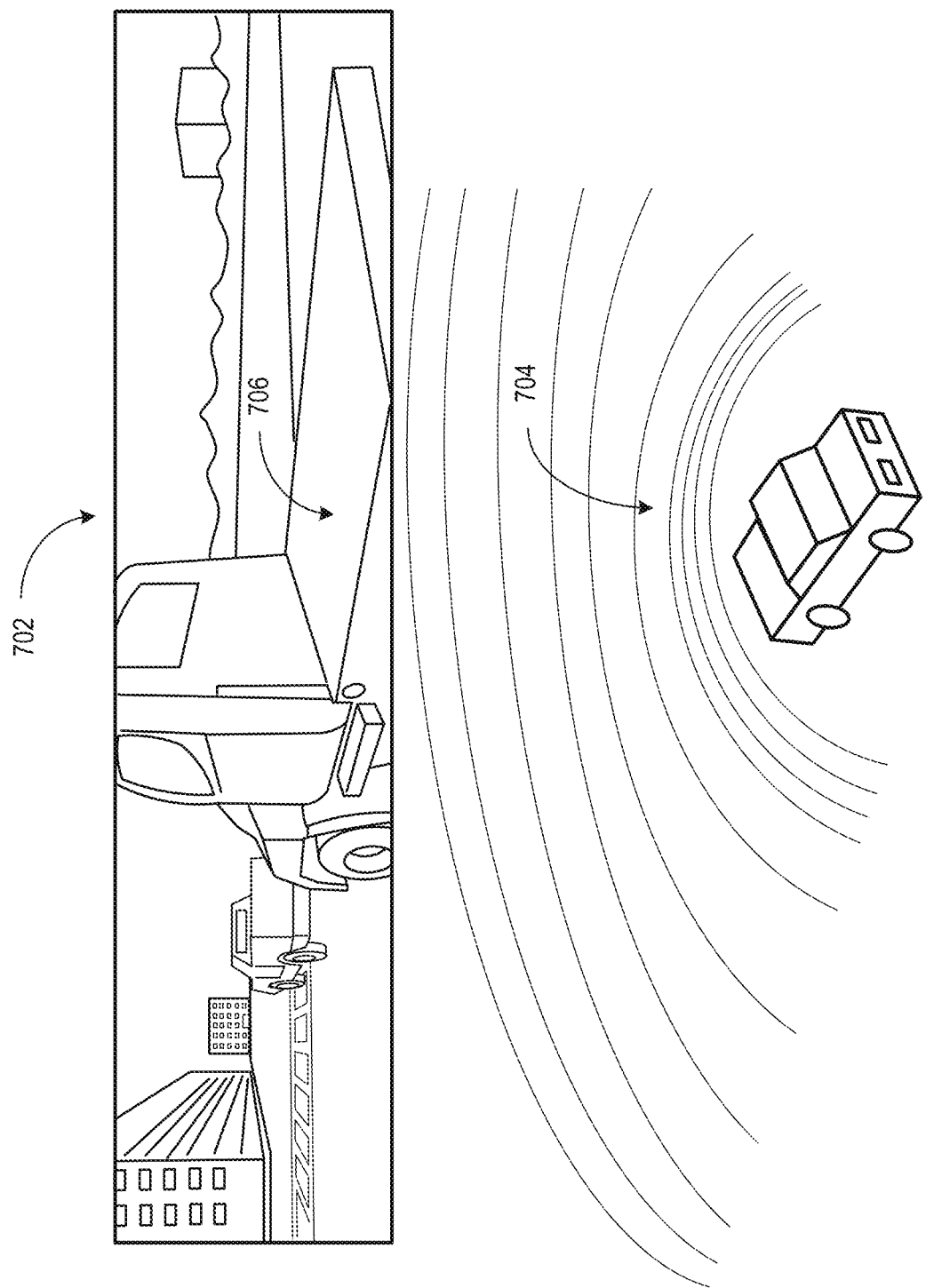
FIG. 7 shows the LiDAR system in operation, in accordance with one or more embodiments.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
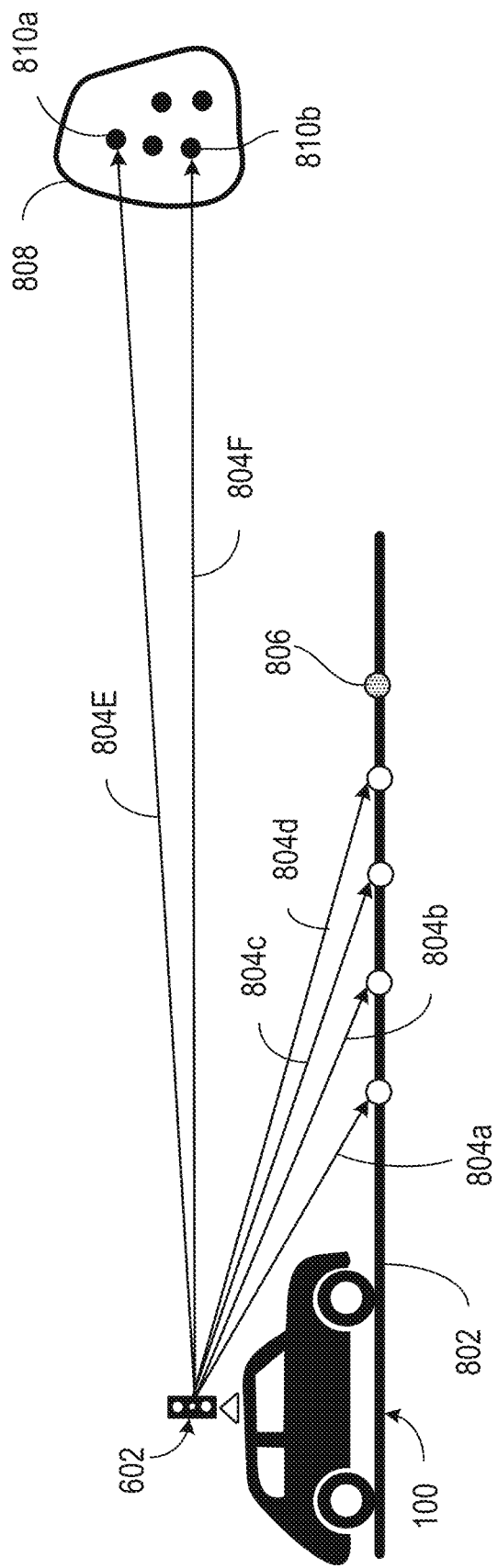
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
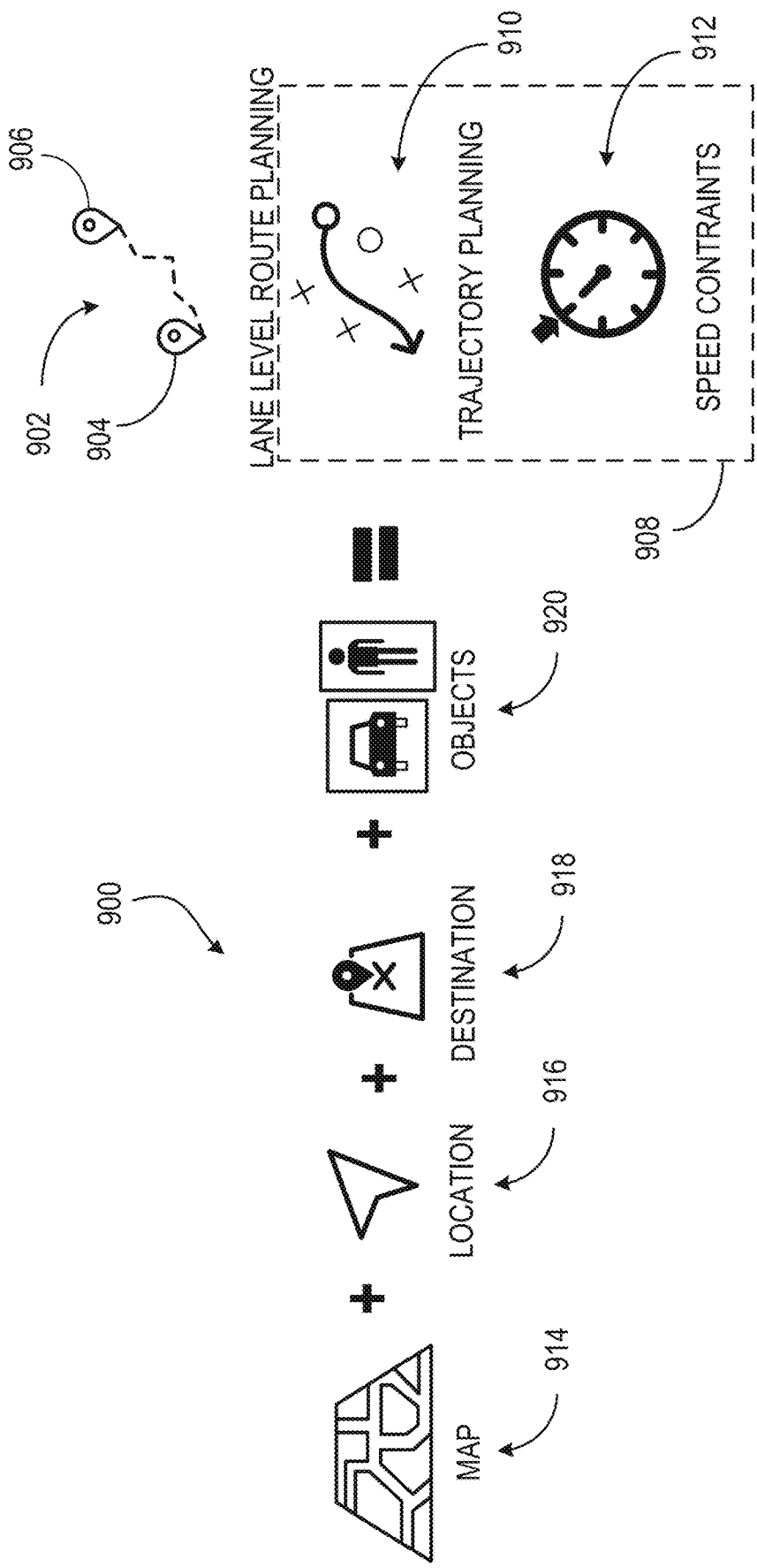
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
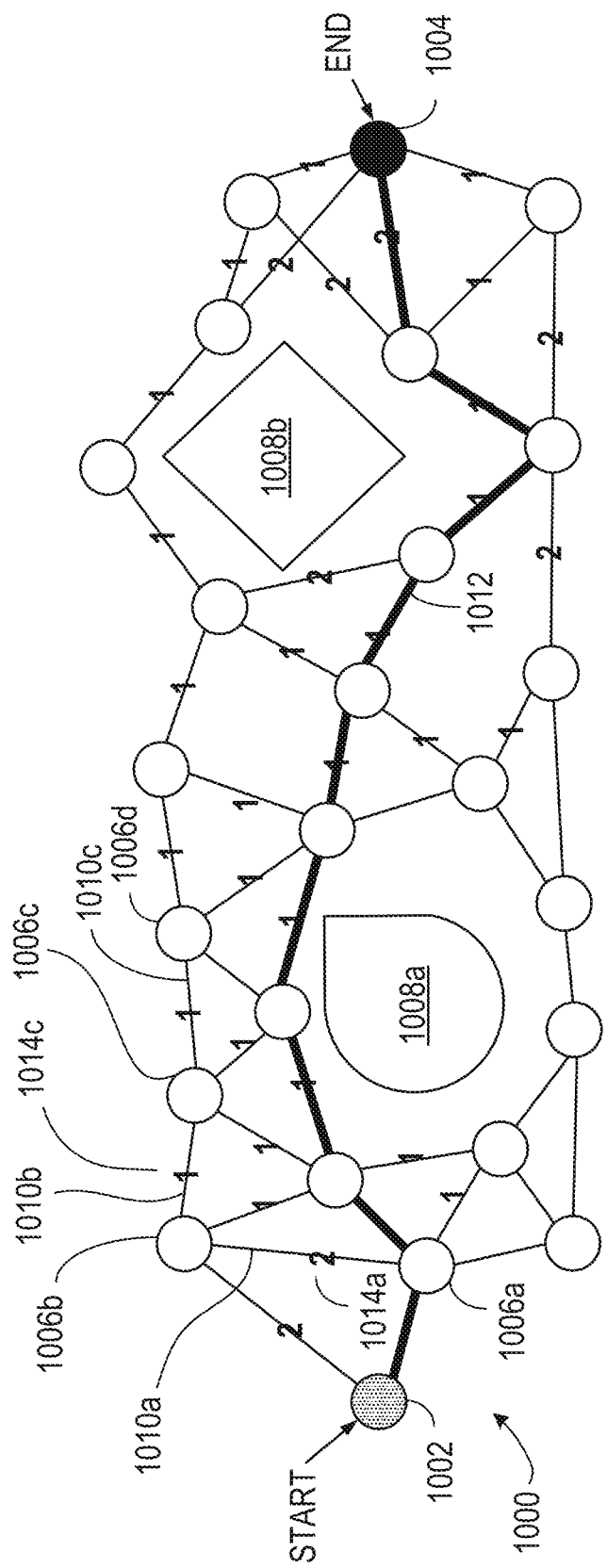
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
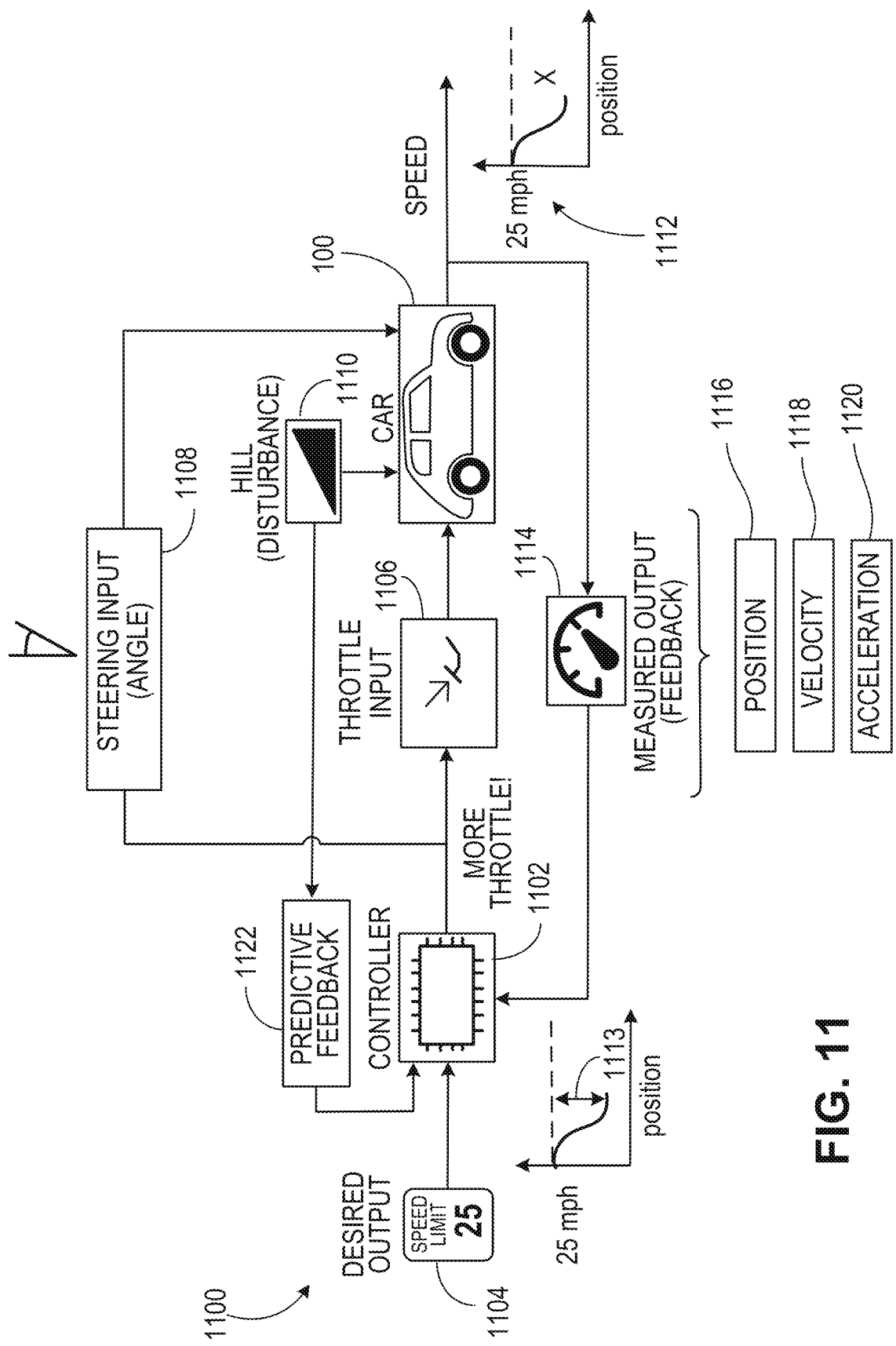
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
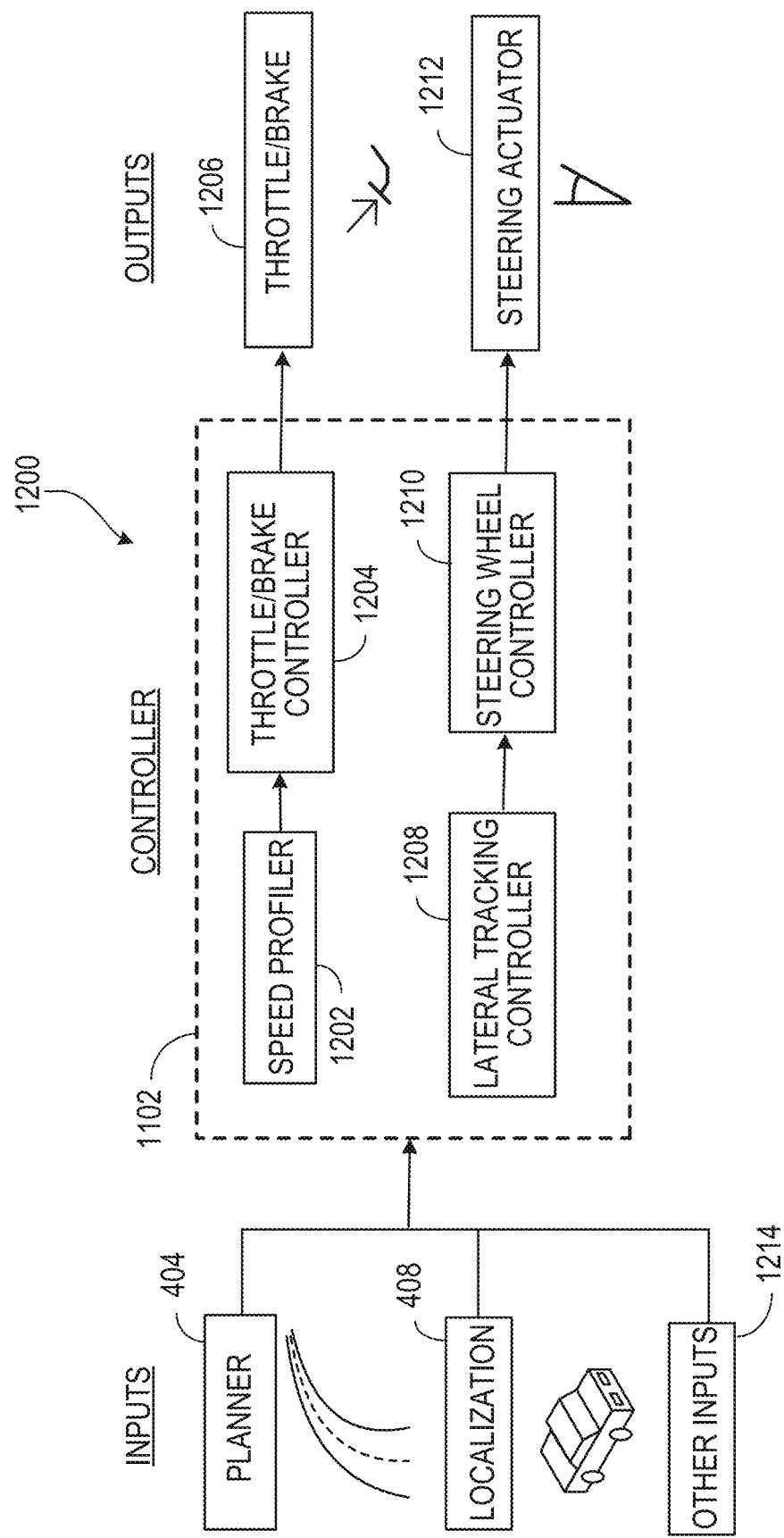
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Operating Environment for an Autonomous Vehicle

Figure 13:
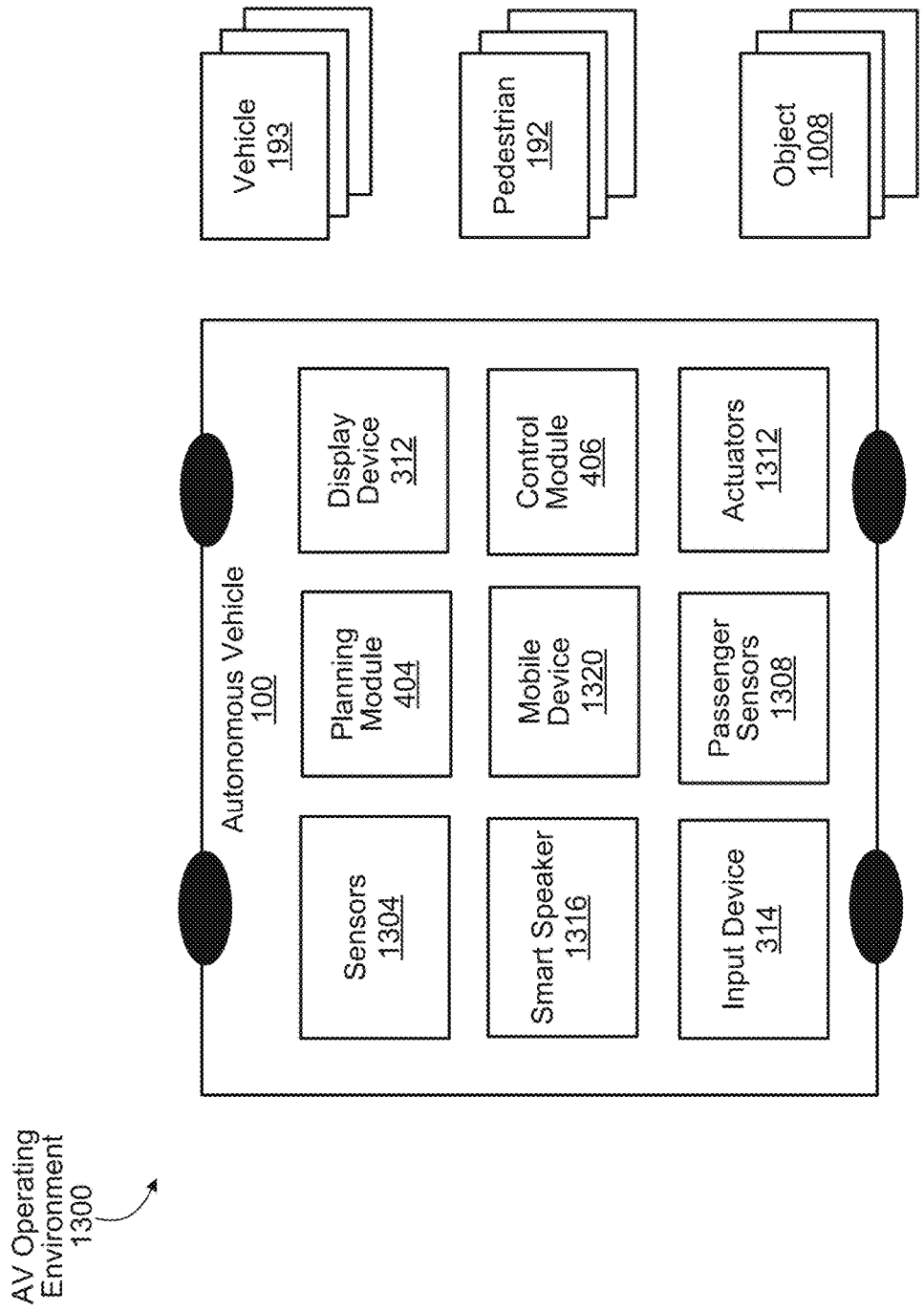
FIG. 13 is a block diagram of an AV operating environment, in accordance with one or more embodiments.

FIG. 13 illustrates a block diagram of an AV operating environment 1300, in accordance with one or more embodiments. The AV operating environment 1300 may be an example of the environment 190 illustrated and described above with reference to FIG. 1. The AV operating environment 1300 is a real-world environment. The AV operating environment 1300 can be a geographical area, such as a state, a town, a neighborhood, or a road network or segment. The AV operating environment 1300 includes an AV 100, one or more vehicles 193, one or more pedestrians 192, and one or more objects 1008. In other embodiments, the AV operating environment 1300 includes additional or fewer entities than those described herein. Similarly, the functions can be distributed among the different entities in a different manner than is described here.

The one or more vehicles 193 are other AVs, semi-autonomous vehicles, or non-autonomous vehicles navigating or parked outside or within the AV operating environment 1300. The vehicle 193 is illustrated and described above with reference to FIG. 1. For example, the vehicle 193 can enter and exit the AV operating environment 1300 during navigation as well as navigate within other environments. The vehicle 193 is part of the traffic experienced on roadways of the AV operating environment 1300 by the AV 1300. In some embodiments, the vehicle 193 belongs to one or more AV fleets.

The pedestrian 192 is a person who is walking or standing on a sidewalk, a crosswalk, a street or some other portion of a drivable area navigable by the AV 100. The pedestrian 192 is illustrated and described above with reference to FIG. 1. In some embodiments, the pedestrian 192 represents a set of objects in the environment that are detected and classified in the AV operating environment 1300. The set includes pedestrians, cyclists or persons riding small form-factor vehicles, such as a skateboards, e-scooters, Segway™, personal light electric vehicle, and personal mobility device.

The one or more objects 1008 are external to the AV 1308 and may be examples of the objects 416 illustrated and described above with reference to FIGS. 4 and 5. The object 1008 is illustrated and described above with reference to FIG. 1008. In some embodiments, the object 1008 is a static portion or aspect of the AV operating environment 1300, such as a road segment, a traffic signal a building, a parking space located on a road segment, a highway exit or entrance ramp, a plurality of lanes of a drivable area of the AV operating environment 1300, an elevation of the drivable area, a curb located adjacent to the drivable area, or a median separating two lanes of the drivable area. In some embodiments, the object 1008 is a dynamic object, such as another vehicle, a pedestrian, or a cyclist. The AV 100 receives sensor data representing the dynamic characteristics of the object 1008 and performs collision prediction and reduces driving aggressiveness if needed. The object 1008 is described above in more detail with reference to the physical object 608, boundaries 616 of a physical object 608, the physical object 706, the ground 802, and the object 808 in FIGS. 6, 7, and 8.

The AV 100 is a partly autonomous or fully autonomous vehicle that uses its sensors 1304 and the planning module 404 to plan a trajectory to navigate around the objects 1008. An example of such a trajectory is the trajectory 198 shown in FIG. 1. The AV 100 includes the sensors 1304, the planning module 404, a display device 312, an input device 314, one or more passenger sensors 1308, one or more actuators 1312, a smart speaker 1316, and a mobile device 1320. The AV 100 is described above in more detail with reference to FIG. 1. In other embodiments, the AV 100 includes additional or fewer components than those described herein. Similarly, the functions can be distributed among the components and/or different entities in a different manner than is described here.

The sensors 1304 sense a state of the environment 1300, such as the presence and structure of the objects 1008. The sensors 1304 transmit sensor data and semantic data representing the state to the planning module 404. In some embodiments, the sensors 1304 are used to obtain sensor data representing the objects 1008 in the AV operating environment 1300. The sensor data is used by the planning module 404 to predict a maneuver of the AV 100 to avoid a collision with the object 1008 based on the sensor data and the trajectory of the AV 100. The sensors 1304 may be an example of the sensors 122-123 illustrated and described above with reference to FIG. 1. The sensors 1304 are communicatively coupled to the planning module 404 to transmit the sensor data and semantic data. The sensors 1304 include one or more monocular or stereo video cameras in the visible light, infrared or thermal (or both) spectra, LiDAR, RADAR, ultrasonic sensors, time-of-flight (TOF) depth sensors, and may include audio sensors (microphones), temperature sensors, humidity sensors, or precipitation sensors.

In some embodiments, the sensors 1304 include spatially distributed smart camera or LiDAR devices capable of processing and fusing the sensor data of the environment 1300 from a variety of viewpoints into a more useful form of data than individual images. The sensor data can include three-dimensional LiDAR point cloud data reflected from a target object 1008 or a camera image of the object 1008 or the AV operating environment 1300. The sensor data is transmitted to the planning module 404 for image processing, communication, and storage functions. The sensors 1304 are described above in more detail with reference to inputs 502a-d, LiDAR system 602, light 604a-c, light emitter 606, light detectors 610, field of view 614, and light 804a-d in FIGS. 6, 7, and 8. The sensor data is described above in more detail with reference to outputs 504a-d, image 612, and LiDAR data points 704 in FIGS. 6, 7, and 8.

The sensors 1304 include one or more odometry sensors that sense a state of the AV 100 with respect to the environment 1300 and transmit odometry data to the planning module 404. The odometry sensors include one or more GNSS sensors, IMUS that measure both vehicle linear accelerations and angular rates, wheel speed sensors for measuring or estimating wheel slip ratios, wheel brake pressure or braking torque sensors, engine torque or wheel torque sensors, or steering angle and angular rate sensors. The AV 100 uses the odometry data to provide a uniquely identifying signature for distinguishing between different spatiotemporal locations within the environment.

In some embodiments, the odometry sensors measure and report a spatiotemporal location of the AV 100 and position relative to a global reference frame. The odometry data can be used to determine attitude, velocity, and position by integrating angular rate from a gyroscope to calculate angular position. The planning module 404 integrates and correlates the odometry data to derive the coordinates of the AV 100 and the objects 1008. In some embodiments, the planning module 404 determines a spatiotemporal location of the AV 100 based on the odometry data received from the sensors 1304. In some embodiments, the planning module 404 determines a spatiotemporal location of an object 1008 relative to the AV 100 based on sensor data received from the sensors 1300. Time-of-flight calculations and distance pinging can be used to determine the spatiotemporal location of an object 1008 relative to the AV 100.

The display device 312 provides data to a passenger riding in the AV 100. The data may represent the trajectory 198 of the AV 100, a maneuver the AV 100 is performing, a map, passenger comfort settings, or operational metrics such as speed or acceleration. The display device 312 is illustrated and described above with reference to FIG. 3. The display device 312 can include an LCD, LED, or AMOLED display, a touchscreen, a haptic display such as a vibrating pad (e.g., for a blind rider), or a loudspeaker to provide audible output to a passenger. The display device 312 can be a mobile device (e.g., tethered to the AV 100), a tablet, or a laptop. In some embodiments, the display device 312 is attached to an interior surface of the vehicle such as mounted on a seat back or to a pillar of the AV 100. The display device 312 is coupled to the sensors 1304, the planning module 404, the input device 314, the passenger sensors 1308, and the actuators 1312.

The input device 314 is illustrated and described above with respect to FIG. 3. The input device 314 can be used to receive haptic, spoken, or other input from one or more passengers in the AV 100. In embodiments, the input device 314 can be a mouse, a touchscreen, a stylus for a tablet, a microphone, a camera, a keyboard, etc. The input from the passenger can include instructions for driving, a preference for a vehicle operation profile, or a desired drive aggressiveness metric. In some embodiments, the input device 314 translates data from a human-readable format or natural language to a computer program, pseudocode, machine-language format, or assembly-level format for the planning module 404. In some embodiments, the input device 314 receives passenger input directed to an object 1008 in the AV operating environment 1300 or in a graphical user interface displayed on the display device 312.

The one or more passenger sensors 1308 measure passenger comfort data of passengers riding in the AV 100. The passenger comfort data represents a level of passenger comfort experienced during a ride. The passenger comfort data is used to determine how comfortable the passenger is and update the graphical user interface on the display device 312 with additional or less information to increase the level of passenger comfort. The passenger comfort data is based on measuring various metrics, for example, eyes-open metrics or eyes-closed metrics. Eyes-open metrics are measured by the passenger sensors 1308 based on a passenger's visual experience of the environment 1300 when the passenger is riding in the AV 100. For example, eyes-open metrics include a distance from environmental features (curbs, construction zones, lane barriers, buildings, etc.), a distance from other vehicles 193 or pedestrians 192, or the passenger's view of the road. Eyes-closed metrics are measured by the passenger sensors 1308 based on a passenger's non-visual experience when the passenger is riding in the AV 100. For example, eyes-closed metrics include velocity, acceleration, lateral acceleration, degree of steering angle, etc.

In some embodiments, the passenger sensors 1308 include biometric sensors used to measure distinctive, measurable physiological characteristics of the passenger representing a comfort level. For example, the passenger sensors 1308 can include an electrodermal sensor, a pulse and heart rate monitor, a sphygmomanometer (blood pressure monitor), or a body temperature sensor (e.g., Infrared thermometer). The passenger comfort data includes biometric data such as electrodermal activity, a pulse, a heart-rate, blood pressure, or a body temperature. The electrodermal activity of the passenger causes variation in the electrical characteristics of the skin and is also known as skin conductance, galvanic skin response, or electrodermal response. The electrodermal activity, pulse, heart rate, blood pressure, and temperature of the passenger is a measure of emotional and sympathetic responses and is used to determine passenger comfort. In an embodiment, the passenger sensors 1308 include sensors for measuring physical characteristics of the passengers. For example, the passenger sensors 1308 may include a weighing scale to measure the passenger's weight and a laser scanner or an internal camera to measure the passenger's height.

In some embodiments, the passenger sensors 1308 include one or more imaging sensors used to record images of a passenger. For example, the passenger sensors 1308 can include a camera, a webcam, or an eye scanner. The passenger comfort data can include imaging data such as facial expressions or a pupillary response (e.g., constriction response or magnitude of pupil dilation). The magnitude of pupil dilation varies the size of the pupil via the optic and oculomotor cranial nerve representing an amount of adrenaline, and is used to determine passenger comfort.

In some embodiments, the passenger sensors 1308 include one or more pressure sensors on the seat, weight sensors embedded on the AV's floor below a passenger's feet, or a wearable glove including haptic sensors used to record the passenger comfort data, such as a pressure exerted by a passenger on seat arm rests, seat back, or a clenched fist. For example, the passenger sensors 1308 include a strain gauge to detect strain due to applied pressure, a capacitive diaphragm, or an electromagnetic sensor to measure change in inductance due to pressure. A magnitude of pressure or haptic feedback exerted by the passenger on the seat arm rests, seat back, or floor represents a level of passenger discomfort associated with the vehicle operation profile.

In some embodiments, the passenger sensors 1308 are used to determine a change in passenger comfort level. For example, a decrease in the passenger comfort level can be detected by an increase in a blood pressure of the passenger measured by the passenger sensors 1308 indicating that the passenger is feeling more anxious. A decrease in the passenger comfort level can be detected by an increase in a pulse rate of the passenger measured by the passenger sensors 1308 indicating that the passenger is scared or worried. A decrease in the passenger comfort level comprises an increase in a pupil dilation of the passenger measured by the passenger sensors 1308 indicating that the passenger is panicking.

Passenger comfort data can also be stored in a profile of the passenger either in memory on the AV 100 or on a remote server and accessed by the AV 100. The planning module 404 determines that the passenger comfort level of the passenger riding in the AV 100 will decrease based at least in part on the stored passenger comfort data. For example, a predicted maneuver can include braking, changing a lane, or swerving. The AV 100 or planning module 404 can determine, using a lookup of the passenger profile, that a particular passenger dislikes sharp turns. If the AV 100 determines that a sharp turn is needed to avoid a collision, the AV 100 can warn or alert the passenger using the smart speaker 1316 or graphical user interface. In some embodiments, the passenger sensors 1308 are used to determine whether passengers are riding in the AV 100 or whether the AV 100 is empty. For example, weight or pressure sensors in the seats or floor can be used. Certain communications to passengers are performed only is a passenger is actually riding in the AV 100.

The one or more actuators 1312 provide haptic communication to the passenger riding in the AV 100. The actuators 1312 can be powered by a motor that converts electrical energy into mechanical torque. The actuators 1312 can be used to vibrate a seat, a back of a seat or an armrest such as to provide a warning.

The smart speaker 1316 is a component of the AV 100 that receives voice commands from a passenger riding in the AV 100. The smart speaker 1316 includes one or more near-field or far-field microphones to receive the commands. The smart speaker 1316 can also deliver audio messages from the AV 100 to a passenger. In some embodiments, the smart speaker 1316 includes or is connected to a smart assistant of the AV 100 using which the passenger can communicate with the AV 100 using voice commands. The smart assistant can look up information, such as weather, route planning, etc., for the passenger and also deliver alerts to the passenger about impending maneuvers. In some embodiments, the smart speaker 1316 is used as an input device to receive passenger input in the form of voice commands. The smart speaker 1316 can translate voice commands to data usable by the planning module 404 for trajectory generation or modification. In some embodiments, the smart speaker 1316 transmits audio output describing a maneuver planned by the AV 100 responsive to receiving a voice command.

The smart speaker 1316 can translate data from the AV 100 to voice or audio output suitable for transmitting to the passengers. In some embodiments, the smart speaker 1316 transmits audio output describing a trajectory of the object 1008 in the real-world environment 1300 responsive to receiving the voice command. For example, a passenger may ask, "Where is that pedestrian going?" The smart speaker 1316 receives the voice command and transmits data to the AV 100 based on the voice command. The planning module 404 identifies a pedestrian 192 being referenced by the passenger based on the voice command and sensor data. The planning module 404 determines a trajectory of the pedestrian 192 based on the sensor data and time-of-flight measurements. The AV 100 transmits output data to the smart speaker 1316 for generation of an audio message or audio output to the passenger in the AV 100 to answer the passenger's question.

In some embodiments, the smart speaker 1316 receives a voice command from a passenger riding in the AV 100. The voice command is directed to the graphical user interface being displayed on the display device 312 or mobile device 1320. For example, the passenger can say, "Tell me more about that brown building" or "Are we taking Route 130?" The smart speaker 1316 transmits data to the AV 100 based on the voice command. The AV 100 identifies an object or trajectory being referenced by the passenger in the graphical user interface based on the voice command. The AV 100 determines information to answer the passenger's question based on sensor data, time-of-flight measurements, or the state of the graphical user interface. A smart assistant may also be used by the AV 100. The AV 100 transmits output data to the smart speaker 1316 for generation of an audio message or audio output to the passenger in the AV 100 to answer the passenger's question. The smart speaker 1316 generates audio output describing the object or trajectory. In some embodiments, a passenger may ask about an operating constraint being followed by the AV 100, such as "Why are we slowing down?" The smart speaker 1316 uses the methods described above to generate audio output describing the operating constraint for the AV 100. The smart speaker 1316 transmits the audio output to the passenger.

In some embodiments, the display device 312 can be a touchscreen. The display device 312 displays the graphical user interface. A passenger riding in the AV 100 can provide haptic input 1508 to the display device 312 to select an icon corresponding to the AV 100 or an object 1008, as illustrated and described below with reference to FIG. 15. The AV 100 or planning module 404 thus receives the passenger input 1508 directed to the object 10008 using the display device 312. At the same time, the AV 100 can receive a voice command directed to the object 1008 using the smart speaker 1316, e.g., "What is this rectangle?" The AV 100 uses the methods described above to identify the object 1008 being referenced and answer the passenger's question using the smart speaker 1316.

In some embodiments, the smart speaker 1316 is used to transmit a warning or alert to a passenger riding in the AV 100. For example, the warning or alert may be in the form of an audio message or output that the AV 100 will shortly perform a braking operation at a particular time or within a particular number of minutes or seconds. The audio message is transmitted to the passenger at a time before the time of braking. The audio message or output can be transmitted responsive to determining that one or more passengers are indeed riding in the vehicle.

The mobile device 1320 is a device that a passenger riding in the AV 100 can carry. The mobile device 1320 can be a smartphone, tablet, smartwatch, etc. The mobile device 1320 can be tethered to the AV 100 or connected to the AV 100 using Bluetooth or a near-field communication (NFC) link. In some embodiments, the mobile device 1320 communicates with a remote server and the AV 100 over the Internet using cellular data. A graphical user interface including geometric models of the AV 100, objects 1008, vehicles 193, and pedestrians 192 can be transmitted to and displayed on the mobile device 1320. A speaker on the mobile device 1320 can deliver audio messages from the AV 100 to a passenger. In some embodiments, the mobile device 1320 has a smart assistant using which the passenger can communicate with the AV 100 using typed text or voice commands.

The planning module 404 receives sensor data from the sensors 1304 and generates a trajectory for the AV 100 at a macro level based on a desired drive aggressiveness or behavior. The planning module 404 predicts maneuvers that the AV 100 will perform on a micro level to conform to the planned trajectory. The planning module 404 can also predict a trajectory that an object 1008 will follow or a maneuver that the object 1008 will perform based on the sensor data. Based on the trajectory and maneuver predicted by the planning module 404, the AV 100 generates a graphical user interface for display on the display device 312. The planning module 404 is illustrated and described in more detail above with reference to FIG. 4. The geometric models, graphs, text, and symbols used in the graphical user interface may be coarse grained or fine grained. The graphical information can be redacted, lacking in detail, or highly detailed depending upon the passenger input or user profile. In some embodiments, personal or sensitive data is not captured by the sensors 1304 or is deleted before the graphical user interface is generated or upon request by a passenger, a government or regulatory agency, or law enforcement.

In some embodiments, the sensor data represents one or more objects 1008, pedestrians 192, or vehicles 193. The sensor data may be two-dimensional (2D) or three-dimensional (3D) LiDAR data. The planning module 404 classifies objects that are within a threshold distance to the AV 100. The objects can be moving objects such as pedestrians 192, cyclists, or vehicles 193. In some embodiments, the graphical user interface includes a 3D representation of travel lanes, traffic lights, traffic signs, or construction zones.

The AV 100 generates a graphical user interface representing the AV 100 and the one or more objects 1008. In some embodiments, the AV 100 generates a geometric model of an object 1008 for display. The graphical user interface includes the geometric model. For example, the geometric model may be a geometric shape such as a rectangle, oval, square, circle, or another type of shape to denote the object 1008. The geometric model may include a thought bubble to represent behavior of the object 1008. In some embodiments, text or symbols are located within the geometric shape as labels, pointers, or other information. For example, the text can specify a speed of the object 1008. Examples of graphical user interfaces including geometric models and icons are illustrated and described below with reference to FIGS. 15 and 16.

In some embodiments, the planning module 404 determines a trajectory of the AV 100 in the real-world operating environment 1300. The planning module 404 may use a shortest-path method or optimize the trajectory based on several cost factors to minimize a number of traffic lights encountered, maximize fuel efficiency, and reduce a likelihood of collision, etc. The planning module 404 predicts a maneuver of the AV 100 to avoid a collision with an object 1008 based on sensor data and a trajectory of the AV 100. For example, the planning module 404 may determine that the AV 100 should swerve left, change lanes, brake, or reverse. In some embodiments, the planning module 404 predicts the maneuver of the AV 100 responsive to the object 1008 being located within a threshold distance from the AV 100. Thus wasteful and unnecessary maneuvers are not predicted or performed.

The AV 100 or planning module 404 retrieves passenger comfort data from a remote server or memory of the AV 100. The planning module 404 determines that the passenger comfort level of a passenger riding in the AV 100 will decrease based on the maneuver. The AV 100 generates a graphical user interface including representations of the AV 100 and the object 1008 for display to the passenger on the display device 312. The graphical user interface includes a graphic, text, or a symbol alerting the passenger of the predicted maneuver. For example, the graphical user interface can include a picture of the AV 100 braking, text stating "We will brake in 15 seconds!" or a symbol representing a braking operation. The AV 100 transmits the graphical user interface to the display device 312.

In some embodiments, the planning module 404 receives passenger comfort data for a passenger riding in the AV 100 from the passenger sensors 1308. The planning module 404 determines that the passenger comfort level has in fact decreased responsive to transmitting of the updated graphical user interface to the display device 312. In response, the AV 100 terminates transmission of the updated graphical user interface to the display device 312.

The graphical user interface includes geometric models representing the AV 100 and other objects. In some embodiments, the geometric model is a geometric shape or an icon, such as a semantic icon, a computer-executable icon, or a clickable icon or graphic. The graphical user interface can include a road structure (e.g., lanes, stop signs, traffic lights, construction zones, etc.). The graphical user interface can include thought bubbles that display behavior of the AV 100 (e.g., "Slowing down for a pedestrian crossing," "Changing lanes," etc.). A thought bubble may be directed only to objects 1008 that are less than a threshold distance from the AV 100, such that the graphical user interface is not overcrowded with data and icons. In some embodiments, the graphical user interface displays operational constraints for the AV 100, such as a requirement to slow down because a vehicle 193 in front of the AV 100 is causing the planning module 404 to reduce the speed of the AV 100. In some embodiments, a speed limit or a representation of a pedestrian 192 who has jumped in front of the AV 100 is displayed.

In some embodiments, the planning module 404 uses time-of-flight methods or LiDAR to determine a distance the object 1008 is from the AV 100. The object 1008 will be displayed on the display device 312 only when it is located within a threshold distance from the AV 100 to prevent overcrowding the display device 312 and to prevent confusing the passenger with irrelevant information. If the passenger sensors 1308 indicate the passenger is feeling uncomfortable due to too much information, less detail about the environment 1300 is displayed. In some embodiment, the planning module 404 determines whether a passenger is riding in the AV 100. The determination is made based on sensor data received from the passenger sensors 1308 of the AV 100. For example, a weight sensor or camera may be used. The AV 100 transmits the graphical user interface to the display device 312 responsive to determining that a passenger is riding in the AV 100. This reduces computation, power consumption, and use of the display device 312 when no one is riding in the AV 100 and no notifications are needed.

In some embodiment, the graphical user interface includes a representation of motion of the one or more objects 1008. For example, a path of a moving object 1008 or a speed of an object 1008 may be displayed using lines, arrows, symbols, or text. The planning module 404 uses the sensor data to determine a position of the object 1008 at different points in time and determine a trajectory of the object 1008. In some embodiments, the planning module 404 determines a trajectory of the object 1008 responsive to receiving passenger input directed to the object 1008 via the input device 314 or smart speaker 1316. In some embodiments, the graphical user interface includes a representation of the trajectory or the predicted motion of the object 1008. The planning module 404 uses previous measurements (position and time) to predict an intent of the object 1008. For example, if the object is a pedestrian 192 on a sidewalk, the planning module 404 may predict that the pedestrian 192 will cross the street or walk on a crosswalk. If the object is a moving vehicle 193 approaching a traffic light that is red or yellow, the planning module 404 predicts that the vehicle 193 will slow down.

In some embodiments, the graphical user interface is labeled using text on the display device 312. For example, the graphical user interface may include a speed, coordinates, or a direction of travel of the AV 100 or the object 1008. A probability of collision of the AV 100 with the object 1008 can be displayed. In other embodiments, the graphical user interface is labeled using a graph such as a time-graph, a bar graph, a pie chart, histogram, etc., showing distance, time traveled, time to destination, etc. In other embodiments, the graphical user interface is labeled using a symbol. For example, traffic lights, construction zones, other vehicles 193, or pedestrians 192 can be labeled using different symbols. In other embodiments, the graphical user interface is labeled using one or more images. For example, a profile image of the passenger can be used to label the AV 100 on the graphical user interface. Camera images of buildings or roundabouts can be used to label portions of the graphical user interface to depict the environment 1300 or the destination of the AV 100.

In some embodiments, the perception module 402 filters noise or uncertainties associated with the sensor data. The perception module 402 is illustrated and described above with reference to FIG. 4. The perception module 402 receives first sensor data representing an object 1008 at a first time. The AV 100 delays generating the representation of the object 1008 within the graphical user interface to determine whether the object 1008 is really present in the AV operating environment 1300 or whether a false positive classification resulted from noise in the first sensor data. After a time delay, the sensors 1304 generate second sensor data. The perception module 402 matches features of the object 1008 captured at the first time to the features captured at the second time to determine whether the object 1008 is truly present in the environment 1300. Responsive to the second sensor data matching the first sensor data, the AV 100 transmits the graphical user interface to the display device 312. In some embodiments, the planning module 404 predicts a maneuver of the AV 100 to avoid a collision with the object 1008 responsive to the second sensor data matching the first sensor data. In some embodiments, the perception module 402 identifies a mismatch between the second sensor data and the sensor data. The perception module 402 determines that the mismatch is associated with the previously identified object 1008. Therefore, the object 1008 is not present in the environment 1300. The AV 100 removes a portion of the sensor data associated with the mismatch prior to the generating of the graphical user interface.

In some embodiments, there is a time difference between the generating of the graphical user interface and the transmitting of the graphical user interface to the display device 312. The generating of the graphical user interface is performed at a first time and the transmitting of the graphical user interface to the display device 312 is performed at a second time. In some embodiments, a time difference between the first time and the second time is increased based on an operating speed of the AV 100. The time lag can be used to provide smoother animation effects on the display device 312 or to remove information that may clutter the screen. The time lag can be tuned to an amount of time it takes a passenger to turn their attention from a vehicle window or viewport to the display device 312. In some embodiments, the time lag can be tuned based on an operating speed of the AV 100. For example, if the AV 100 is moving faster, the time lag between generating the graphical user interface and displaying it on the display device 312 can be smaller.

In some embodiments, the perception module 402 determines a level of confidence associated with the generating of the graphical user interface. For example, LiDAR observations having a lower level of confidence may be filtered out, such that false positives are not displayed on the display device 312. The perception module 402 may determine a score indicative of a likelihood greater than zero that a segment of sensor data represents a pedestrian 192 or some other object 1008. Responsive to the score being less than a threshold value, the AV 100 either does not transmit the graphical user interface to the display device 312 or deletes the display of the pedestrian 192 or object 1008 from the display device 312. The transmitting of the graphical user interface to the display device 312 is performed responsive to the level of confidence exceeding a threshold value.

In some embodiments, the perception module 402 filters the sensor data to remove noise from the sensor data using digital signal processing. For example, a median filter can be used to remove noise from an image or a sensor signal in a pre-processing step to improve the results of later processing. The generating of the graphical user interface is performed based on the filtered sensor data, such that false positives do not occur. False negatives may also be detected using time delays and noise filtering. Because of noise in the sensor data, an object 1008 may disappear from the graphical user interface if no noise filtering is performed (a false negative). The object 1008 may then reappear a few image frames later. The perception module 402 avoids such false negatives by matching successive image frames to detect whether the object 1008 really disappeared from the environment 1300. In some embodiments, the planning module 404 predicts a maneuver of the AV 100 to avoid a collision with an object 1008 based on the filtered sensor data, such that wasteful or unnecessary maneuvers are reduced.

In some embodiments, the AV 100 removes a portion of the sensor data prior to the generating of the graphical user interface. The sensor data can include unnecessary information or details of the environment 1300. For example, details of a busy highway or buildings may be of little interest to a passenger or may confuse the passenger. The LiDAR point cloud may be edited to remove outliers or noise. Edge detection may be performed on LiDAR images or camera images to identify objects that should not be displayed. The sensor data pertaining to those objects is deleted.

In some embodiments, the planning module 404 identifies an object 1008 such that a probability of a collision of the AV 100 with the object 1008 is greater than a threshold value. For example, the object 1008 may be a vehicle 193 that is slowing down in front of the AV 100 or a pedestrian 192 who has jumped into the street in front of the AV 100. The probability of collision is calculated based on lateral clearance of the AV 100 from the object 1008 or a relative speed of the object 1008 and the AV 100. In some embodiments, the planning module 404 determines the probability of collision for the AV 100 with the object 1008 by predicting a trajectory for the object 1008. The planning module 404 may predict that the object 1008 will move in a straight line at its present speed. In some embodiments, the planning module 404 uses an extended Kalman filter to track the object 1008 and determine a time for a potential collision. In another embodiment, the perception module 402 uses sensor fusion to combine sensor data (e.g., using a Kalman filter) from the sensors 1304. The planning module 404 determines potential behaviors for the object 1008 (e.g., change of lanes, left turn, etc.) and assigns probabilities to each potential behavior.

In some embodiments, the perception module 402 identifies or classifies an object 1008 based on sensor data received from the sensors 1304. The planning module 404 determines one or more operating constraints for the AV 100 to avoid a collision of the AV 100 with the object 1008. For example, an operating constraint may specify a maximum operating speed for the AV 100 or a minimum distance that the AV 100 should maintain from a vehicle 193 to avoid a collision. The operating constraint may direct the AV 100 to change lanes to avoid a collision. In some embodiments, the operating constraint includes a minimum operating speed for the AV 100. For example, the AV 100 may sense that a vehicle 193 is about to cross the road in front of the road and the AV 100 does not have enough time to stop. The AV 100 may speed up to get out of the way of the vehicle 193.

In some embodiments, the operating constraint includes a maximum acceleration of the AV 100. For example, the planning module 404 can determine a maximum acceleration limit such that the AV 100 does not speed up too fast and collide with the object 1008. In other embodiments, the operating constraint includes a minimum acceleration. For example, the AV 100 may sense that a pedestrian 192 is about to cross the road in front of the road and the AV 100 does not have enough time to stop. The AV 100 may accelerate to get out of the way of the pedestrian 192. In other embodiments, the operating constraint specifies a lane of the road for the AV 100 to operate in. For example, there may be a construction zone ahead in a first lane of the road in which the AV 100 is driving. The planning module 404 therefore generates an operating constraint that specifies a second lane of the road for the AV 100 to drive in such that a collision of the AV 100 with the construction zone is avoided. Examples of operating constraints are illustrated and described above with reference to speed constraints 912 in FIG. 9 and physical constraints in FIG. 10. The AV 100 updates the graphical user interface to display the operating constraint. For example, a graphic, text, or a symbol denoting the operating constraint is added to the graphical user interface.

In some embodiments, the AV 100 adjusts a size of the representation (e.g., icon or polygon) of the object 1008 based on the probability of the collision of the AV 100 with the object 1008. For example, if the planning module 404 determines that the probability of the collision of the AV 100 with the object 1008 is higher, the AV 100 increases the size of an icon representing the object 1008. The planning module 404 then generates an operating constraint for the AV 100 to avoid the collision. Once the probability of the collision of the AV 100 with the object 1008 lessens, the AV 100 decreases the size of the icon representing the object 1008.

In some embodiments, the AV 100 generates a graphical user interface including geometric models of the AV 100 and an object 1008 located at a first distance d1 to the AV 100 at a first time t1. The AV 100 uses its sensors 1304 to sense at time t1 that the object 1008 (e.g., a vehicle, a pedestrian, a construction zone, etc.) is at a distance d1 from the AV 100. For example, LiDAR sensors can be used to determine the distance d1 based on the time it takes for LiDAR beams emitted by the AV 100 towards the object 1008 to return to the AV 100. The perception module 402 receives sensor data representing the object 1008 from the sensors 1304 at a second time t2. At a second time t2 after the first time t1, the planning module 404 determines that the object 1008 is located at a second distance d2 to the AV 100 and that the second distance d2 is smaller than the first distance d1. The planning module 404 therefore determines that the AV 100 and the object 1008 are approaching each other.

The planning module 404 may identify that a collision of the AV 100 with the object 1008 is likely or possible. In some embodiments, the planning module 404 determines a time difference t2−t1 between the first time t1 and the second time t2. The planning module 404 determines a distance difference d2−d1 between the first distance d1 and the second distance d2. The planning module 404 determines a probability of collision of the AV 100 with the object 1008 based on the time difference t2−t1 and the distance difference d2−d1. For example, if t2−t1 is smaller and d2−d1 is larger, the probability of collision will be higher.

The planning module 404 generates an operating constraint for the AV 100 to avoid a collision with the object 1008. The planning module 404 may determine a vehicular maneuver for the AV 100 to avoid a collision with the object 1008. For example, the planning module 404 may determine that the AV 100 should increase an operating speed to avoid the collision, slow down, or change lanes, etc. In some embodiments, the vehicular maneuver includes altering an operating speed of the AV 100 using the control module 406 of the AV 100. The control module 406 is illustrated and described above with reference to FIG. 4. The vehicular maneuver can include altering an acceleration of the AV 100 using the control module 406 and control functions 420a-c (e.g., steering, throttling, braking, ignition) to slow down or speed up the AV 100. The control functions 420a-c (e.g., steering, throttling, braking, ignition) are illustrated and described above with reference to FIG. 4. The vehicular maneuver can include altering a lane in which the vehicle is operating using the control module 406 and steering control 102 illustrated and described above with reference to FIG. 1. In some embodiments, a vehicular maneuver includes adjusting a trajectory of the AV 100 such that a distance of the AV 100 from the object 1008 is increased at a third time t3 after the second time t2.

The AV 100 updates the graphical user interface, such that the updated graphical user interface includes a representation of the vehicular maneuver. For example, the updated graphical user interface can include a thought bubble with text explaining that the AV 100 is speeding up or slowing down to avoid a pedestrian 192 or vehicle 193. The updated graphical user interface can include arrows showing that the AV 100 is turning to avoid a construction zone. In some embodiments, the AV 100 updates the graphical user interface such that the updated graphical user interface displays a trajectory of the AV 100 corresponding to the vehicular maneuver. The AV 100 displays the updated graphical user interface on the display device 312.

The AV 100 receives passenger input directed to an object 1008 that is displayed on the display device 312. For example, a passenger may press, tap, or scroll near or on the referenced object 1008 on the display device 312 to request more information about the referenced object 1008 or to delete the display of the referenced object 1008. The passenger input may indicate to the AV 100 that the passenger has received a message from the display device 312 or that the display device 312 should display greater detail about the referenced object 1008.

In response to receiving the passenger input from the input device 314, the AV 100 updates a representation of the object 1008 within the graphical user interface. For example, the AV 100 may display greater detail about the referenced object 1008 (e.g., a distance of the referenced object 1008 to the AV 100, a color of the referenced object 1008, a classification of the referenced object 1008, predicted future motion of the referenced object 1008, etc.). The AV 100 may display less detail about the referenced object 1008 or delete the referenced object 1008 from the display device 312. In some embodiments, based on the passenger input, the AV 100 updates a representation of the object 1008 by increasing, within the graphical user interface, a size of the object 1008. For example, a size of an icon portraying the referenced object 1008 may be increased. In some embodiments, the AV 100 updates the representation of the object 1008 by increasing, within the graphical user interface, a display resolution of the referenced object 1008. This can help the passenger to better understand the type of object 1008 or the behavior of the referenced object 1008.

In some embodiments, the AV 100 receives passenger input (e.g., haptic input 1508 in FIG. 15 below) referencing an object 1008 displayed on the graphical user interface using the display device 312, such as when the display device 312 is a touchscreen. The graphical user interface can include a computer-executable semantic icon representing the referenced object 1008. The computer-executable semantic icon is configured to transmit the passenger input to the AV 100. For example, a passenger selects an icon representing the object 1008 on the display device 312 to obtain more information on a maneuver that the AV 100 is making to avoid a collision with the referenced object. Responsive to receiving the passenger input from the computer-executable semantic icon, the AV 100 displays text representing the first time t1 and the first distance d1 on the display device 312. In some embodiments, the AV 100 displays text representing the second time t2 and the second distance d2 on the display device 312. The display assists the passenger in comprehending the maneuver and the reason for the maneuver. In other embodiments, the representation of a vehicular maneuver displayed can include one or more animated icons configured to be displayed on the display device 312. For example, the icons may be animated GIFs that portray a pedestrian walking in front of the AV 100 and the AV 100 turning or stopping to avoid hitting the pedestrian.

In some embodiments, the AV 100 provides an advance warning to a passenger riding in the AV 100 that the AV 100 will brake. The passenger can thus prepare herself and the warning increases a level of passenger comfort. To provide the warning, the planning module 404 determines whether the AV 100 will perform a braking operation at a third time t3. For example, the AV 100 may use its sensors 1304 to sense an object 1008. The planning module 404 uses the sensor data to determine that a braking operation is necessary to avoid a collision of the AV 100 with the object 1008. In some embodiments, the performing of the braking operation is to avoid a collision of the AV 100 with the object 1008. Responsive to determining that the AV 100 will perform the braking operation, the AV 100 determines, using the passenger sensors 1308, whether one or more passengers are riding in the AV 100.

Responsive to determining that passengers are present, the AV 100 transmits audio output using the smart speaker 1316 at a fourth time t4 before the third time t3. The audio output or message informs the passengers that the AV 100 will perform the braking operation at the third time t3. In some embodiments, the audio output includes an instruction to the passengers to grasp an armrest of the AV 100 prior to the AV 100 performing the braking operation. The audio output can include an instruction to the passengers to prepare for the braking operation, such as by securing bags or belongings. In some embodiments, the AV 100 transmits the audio output based on the passenger comfort preferences. In some embodiments, the AV 100 transmits the audio output informing the passengers that the AV 100 will perform the braking operation responsive to the time difference between the current time t4 and the third time t3 falling below a threshold. In some embodiments, the update to the graphical user interface is displayed responsive to the time difference falling below a threshold. The AV 100 further displays, on the display device 312, an update to the graphical user interface. The update includes a representation of a time difference between t4 and t3.

In some embodiments, the performing of the braking operation is intended to obey a traffic rule such as a reduced speed limit. For example, the planning module 404 determines a spatiotemporal location of the AV 100 based on odometry data received from the one or more sensors 1304 of the AV 100. The sensors 1304 include GNSS sensors to determine the location. The planning module 404 determines a spatiotemporal location of a traffic light relative to the AV 100 based on sensor data. For example, the perception module 402 may use the LiDARs of the AV 100 to sense the traffic light. The perception module 402 may use object recognition, pattern matching, or object classification to make the determination from the sensor data. The perception module 402 further determines whether a color of the traffic light is red or yellow based on the sensor data received from the one or more sensors 1304. For example, a camera of the AV 100 can be used to detect the color of the traffic light. The planning module 404 generates instructions for the braking operation responsive to determining that the color of the traffic light is red or yellow.

Responsive to determining that the AV 100 will perform the braking operation at the third time t3, the AV 100 generates a graphical representation of the braking operation. For example, the graphical user interface can include a thought bubble that displays the braking behavior of the AV 100. The graphical user interface can be labeled with text, e.g., "slowing down for pedestrian crossing the street," or "changing lanes to avoid a vehicle." In some embodiments, the thought bubble is displayed for objects that are less than a threshold distance from the AV 100. In this manner, thought bubbles for objects that are further away are not displayed to avoid confusing the passenger. The thought bubble can be used to increase passenger comfort. For example, if the thought bubble displays a message stating "we are about to brake in 10 seconds," the passenger can lean back in her seat, grab the door handles, or brace herself, etc.

At a fourth time t4 that is before the third time t3, the graphical user interface displaying the braking operation is transmitted to the display device 312 of the AV 100. In some embodiments, the graphical user interface includes a textual representation of a difference t3–t4 between the third time t3 and the fourth time t4. The textual representation provides the passenger with information describing when or how soon the braking operation will occur. In other embodiments, operating constraints for the AV 100 are displayed on the display device 312. For example, the display device 312 can display a message or graphic stating that a vehicle 193 in front of the AV 100 is causing the planning module 404 to reduce the speed of the AV 100. The display device 312 can display a message or graphic stating the speed limit of the road or that a pedestrian 192 has jumped in front of the AV 100.

In some embodiments, the planning module 404 retrieves passenger comfort preferences of a passenger riding in the AV 100 from a server 136 or a data storage unit 142 of the AV 100. The server 136 and data storage unit 142 are illustrated and described above with reference to FIG. 1. For example, the passenger comfort preferences may specify that the passenger is to be alerted a certain time before braking or that the passenger prefers text to icons on the display device 312. The generating of the graphical user interface is performed by the AV 100 based on the passenger comfort preferences. In some embodiments, the graphical user interface includes a semantic computer icon. The retrieved passenger comfort preferences can specify a size and a resolution of the semantic computer icon. In other embodiments, the AV 100 transmits the graphical user interface to the display device 312 responsive to receiving passenger comfort data using the one or more passenger sensors 1308 of the AV 100 indicating a particular level of passenger comfort. For example, the passenger may be notified of impending braking operations if she is uncomfortable.

In some embodiments, the AV 100 transmits a signal, such as an electrical or digital signal, to one or more actuators 1312 located within the AV 100. The signal instructs the actuators 1312 to vibrate. The vibration is indicative of the braking operation. The graphical user interface is thus accompanied by physical signals to alert the passenger riding in the AV 100. For example, vibrating armrests or seat cushions indicate to the passenger that the AV 100 is going to brake and that the passenger should steady herself and prepare for the braking operation. In some embodiments, the graphical user interface or audio output includes an instruction to a passenger riding in the AV 100 to grasp an armrest of the AV 100 at a time t4 prior to the AV 100 performing the braking operation at time t3. The instruction can be displayed on the display device 312 as text, an icon, or a symbol.

In some embodiments, the planning module 404 determines the time difference t3–t4 between the third time t3 and the fourth time t4. The time t4 is calculated such that the passenger will have enough time to grasp a door handle or steady herself. The AV 100 transmits the graphical user interface to the display device 312 responsive to the time difference t3–t4 falling below or being less than a threshold value. In this manner, the passenger will be notified only when a braking operation is imminent and the passenger will not be notified if the AV 100 is far away from the object 1008.

Display Devices for Autonomous Vehicles

Figure 14:
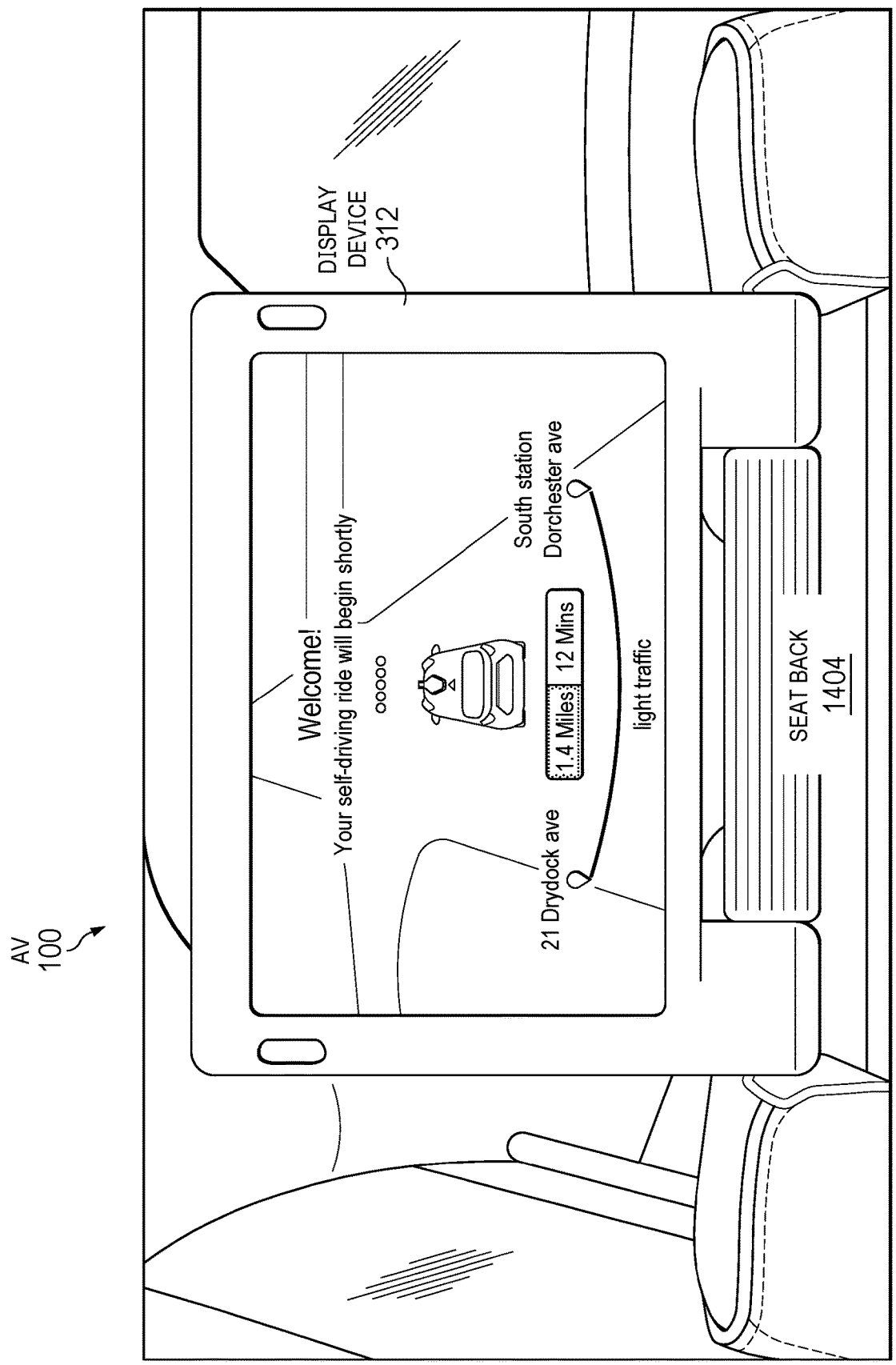
FIG. 14 illustrates a display device for displaying autonomous vehicle behaviors in a graphical user interface, in accordance with one or more embodiments.

FIG. 14 illustrates a display device 312 for displaying autonomous vehicle behaviors in a graphical user interface, in accordance with one or more embodiments. The display device 312 displays a graphical user interface providing data to a passenger riding in the AV 100. The data may represent the trajectory 198 of the AV 100, a maneuver the AV 100 is performing, a map, passenger comfort settings, or operational metrics such as speed or acceleration. The display device 312 is illustrated and described above with reference to FIGS. 3 and 13. The display device 312 can include an LCD, LED, or AMOLED display, a touchscreen, a haptic display such as a vibrating pad (e.g., for a blind rider), or a loudspeaker to provide audible output to a passenger. The display device 312 can be a mobile device (e.g., tethered to the AV 100), a tablet, or a laptop. In some embodiments, the display device 312 is attached to an interior surface of the vehicle such as mounted on a seat back 1404 or to a pillar of the AV 100.

Figure 15:
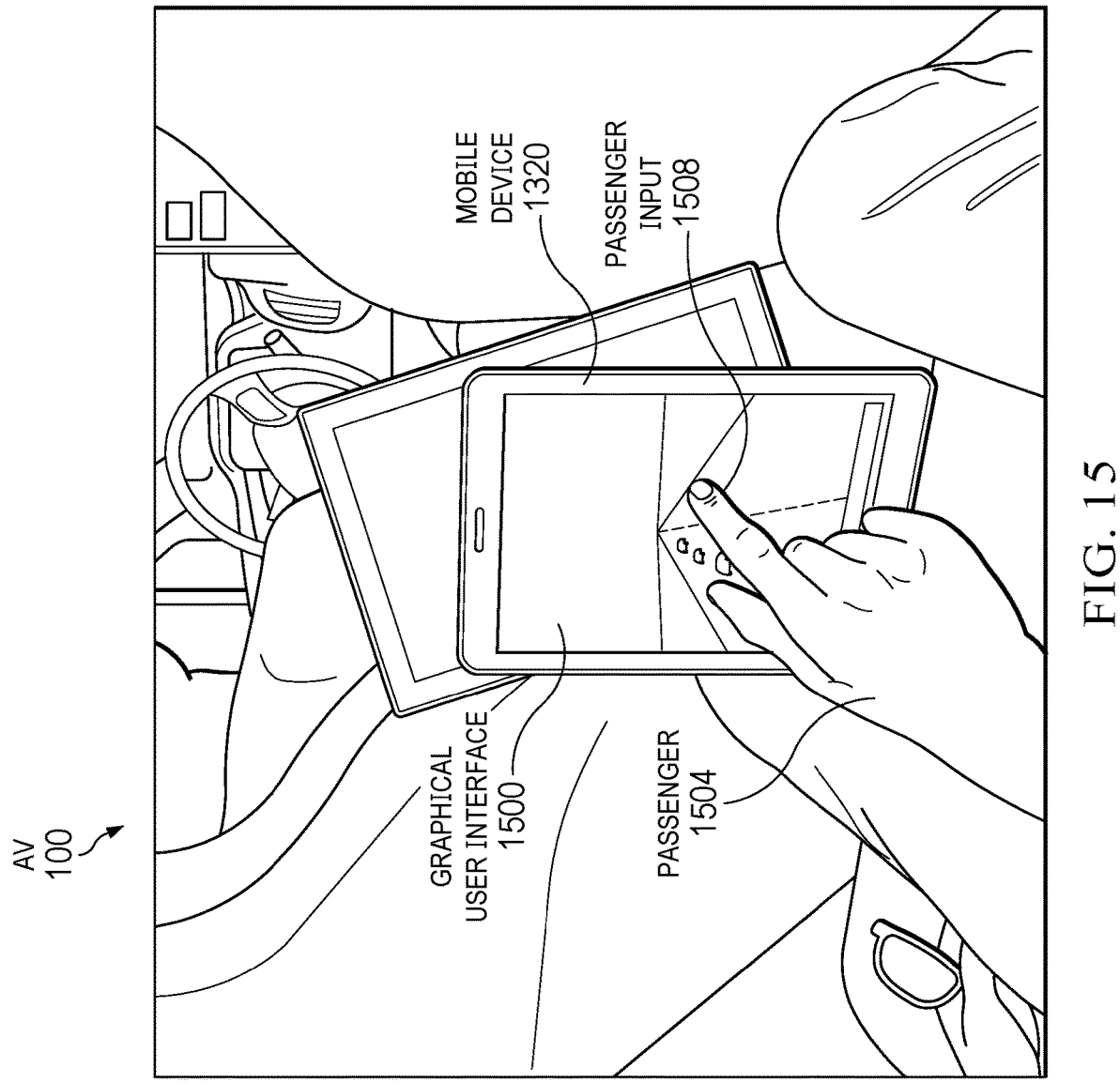
FIG. 15 illustrates a mobile display device for displaying autonomous vehicle behaviors in a graphical user interface, in accordance with one or more embodiments.

FIG. 15 illustrates a mobile display device 1512 for displaying autonomous vehicle behaviors in a graphical user interface 1500, in accordance with one or more embodiments. A passenger can carry the mobile device 1320 onto the AV 100 and the mobile device 1320 can be tethered to the AV 100. The mobile device 1320 is described in more detail above with reference to FIG. 13. In some embodiments, the mobile device 1320 receives haptic passenger input 1508 from a passenger 1504. In other embodiments, the mobile device 1320 receives spoken voice commands and transmits them to the AV 100 over Bluetooth or NFC.

Graphical User Interface for Displaying Autonomous Vehicle Behaviors

Figure 16:
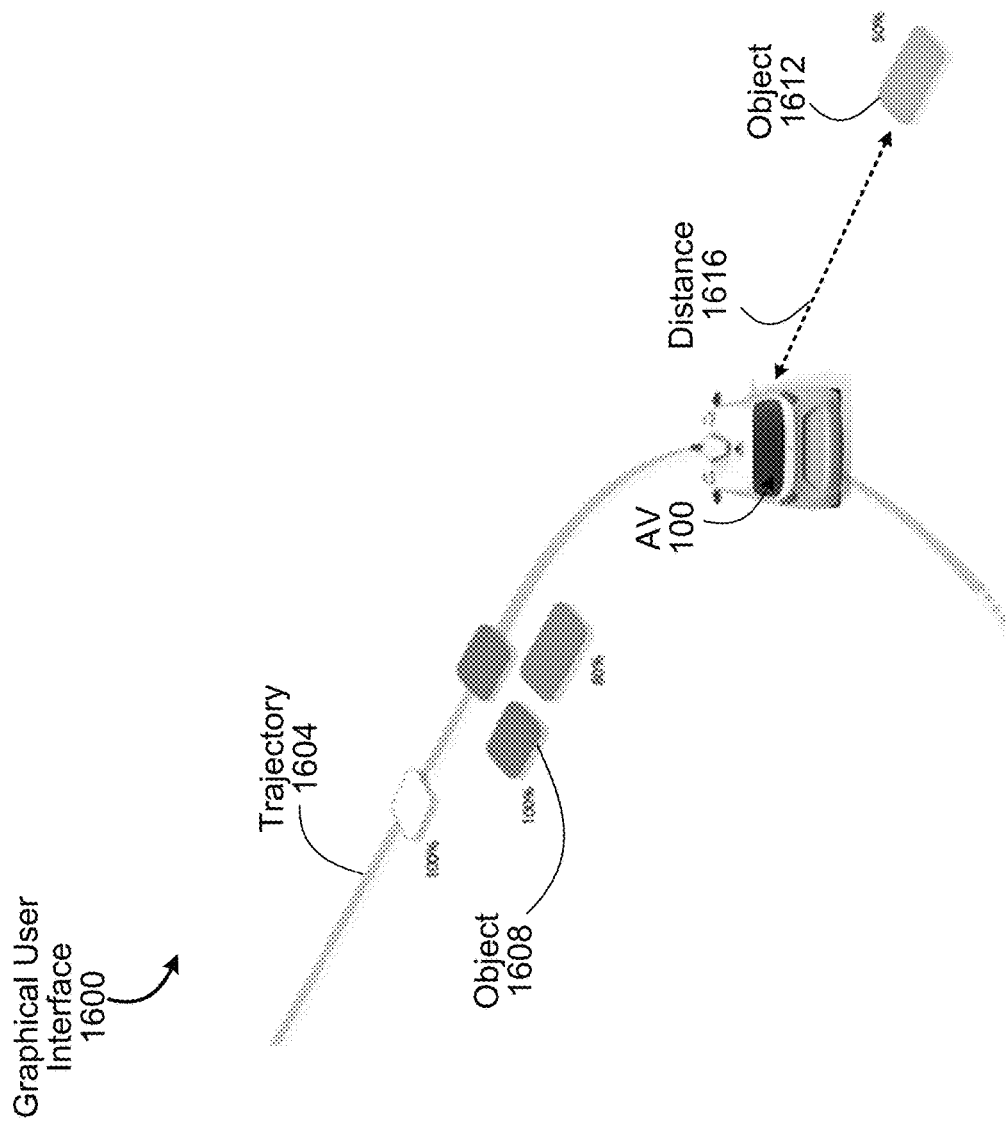
FIG. 16 illustrates a graphical user interface for displaying autonomous vehicle behaviors, in accordance with one or more embodiments.

FIG. 16 illustrates a graphical user interface 1600 for displaying autonomous vehicle behaviors, in accordance with one or more embodiments. The graphical user interface 1600 includes representations of the AV 100, a trajectory 1604 of the AV 100, and objects 1608 and 1612. The level of confidence of the AV 100 in identifying the objects based on the sensor data is illustrated. Geometric models are used to display the various objects. The level of confidence of the AV 100 in identifying object 1608 is 100%. The object 1608 is therefore represented using a darker color. The level of confidence of the AV 100 in identifying object 1612 is 50%. The object 1608 is therefore represented using a lighter color.

Geometric Models for Displaying Autonomous Vehicle Behaviors

Figure 17:
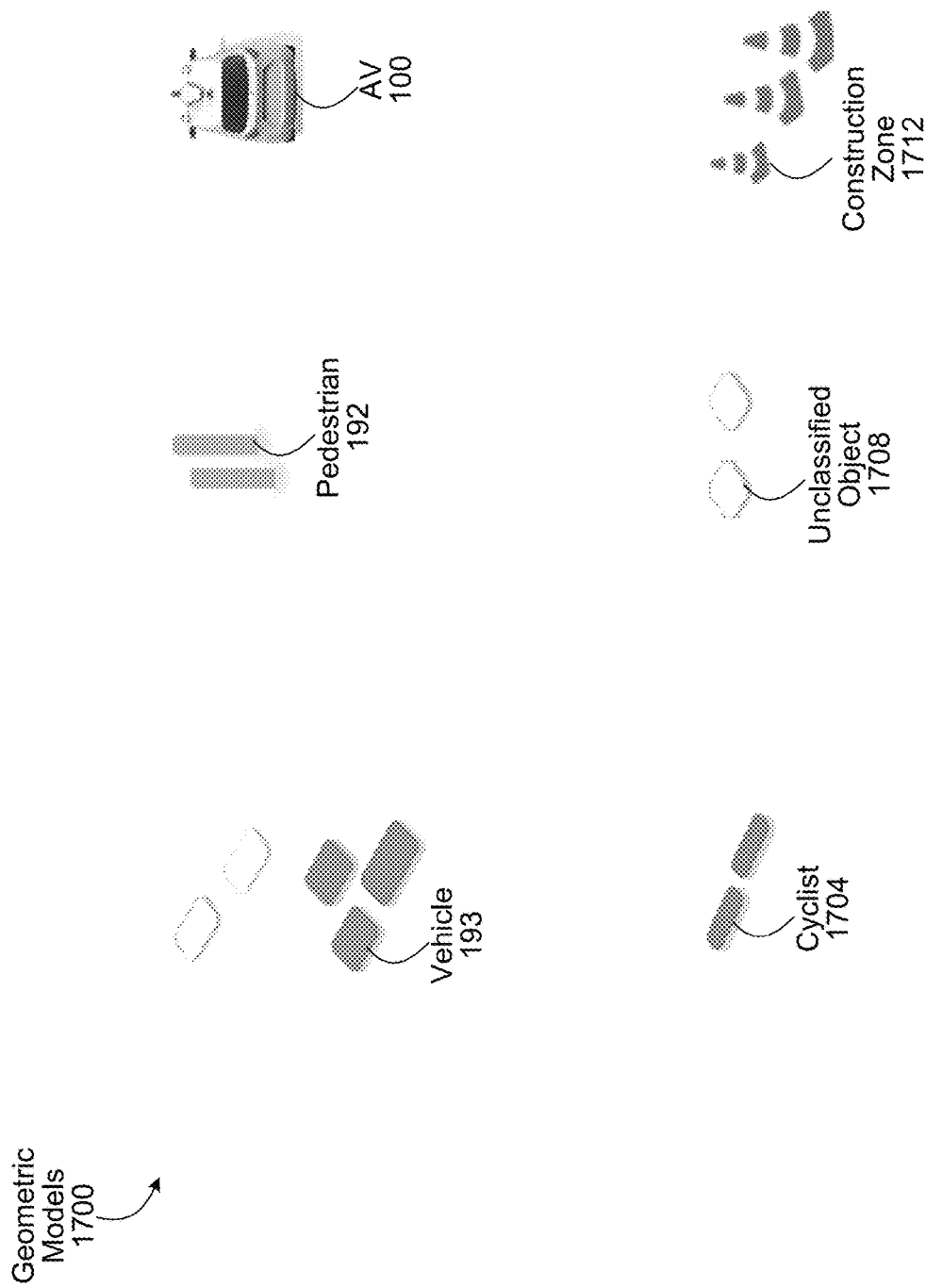
FIG. 17 illustrates geometric models for displaying autonomous vehicle behaviors, in accordance with one or more embodiments.

FIG. 17 illustrates geometric models 1700 for displaying autonomous vehicle behaviors, in accordance with one or more embodiments. Different types of geometric models and icons are used to represent a vehicle 193, a pedestrian 192, the AV 100, a cyclist 1704, unidentified object 1708, and a construction zone 1712. The geometric models are embedded within a graphical user interface for display.

Graphical User Interfaces for Displaying Autonomous Vehicle Behaviors

Figure 18:
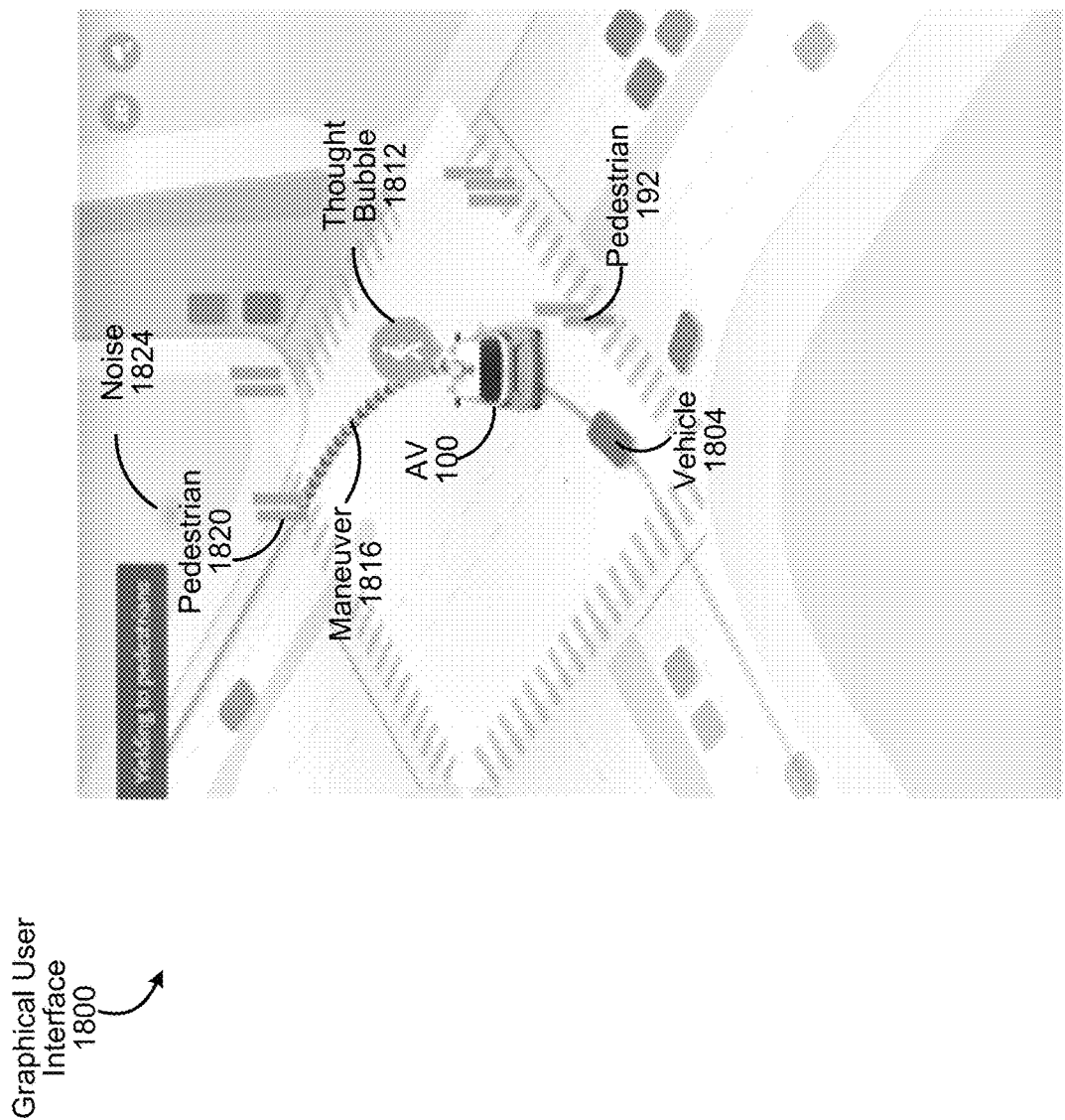
FIG. 18 illustrates a graphical user interface for displaying autonomous vehicle behaviors, in accordance with one or more embodiments.

FIG. 18 illustrates a graphical user interface 1800 for displaying autonomous vehicle behaviors, in accordance with one or more embodiments. The graphical user interface 1800 includes representations of the AV 100, a vehicle 1804, a pedestrian 192, a pedestrian 1820, a thought bubble 1812, and a maneuver 1816 for the AV 100.

The AV 100 generates the graphical user interface 1800, which includes the representations of the AV 100 and the pedestrian 192, as described above with reference to FIG. 13. The AV 100 determines that the pedestrian 1820 is crossing the street in front of the AV 100 and that the AV 100 and the pedestrian 1820 are approaching each other. The AV 100 may determine a probability of collision for the AV 100 with the pedestrian 1820. The AV 100 determines a vehicular maneuver 1816 (e.g., turning left) for the AV 100 to avoid a collision with the pedestrian 1820. The AV 100 may increase its speed to get away, slow down, or change lanes, etc. The AV 100 updates the graphical user interface 1800, such that the updated graphical user interface 1800 includes a representation of the vehicular maneuver 1816. The representation of the maneuver is the thought bubble 1812, which includes an icon of a pedestrian. The AV 100 displays the updated graphical user interface 1800 on the display device 312.

In some embodiments, the perception module 402 filters noise 1824 or uncertainties associated with the sensor data. The AV 100 delays constructing the representation of an object within the graphical user interface 1800 to determine whether the object is really present or whether a false positive classification resulted from noise 1824 in the sensor data. After a time delay, the sensors 1304 generate new sensor data representing the object. The perception module 402 matches features of the sensor data to determine whether the object is truly present. In some embodiments, the perception module 402 filters the sensor data to remove the noise 1524 from the sensor data using digital signal processing. For example, a median filter can be used to remove the noise 1524 from an image or a sensor signal in a pre-processing step to improve the results of later processing. The generating of the graphical user interface 1800 is performed based on the filtered sensor data, such that false positives do not occur.

Figure 19:
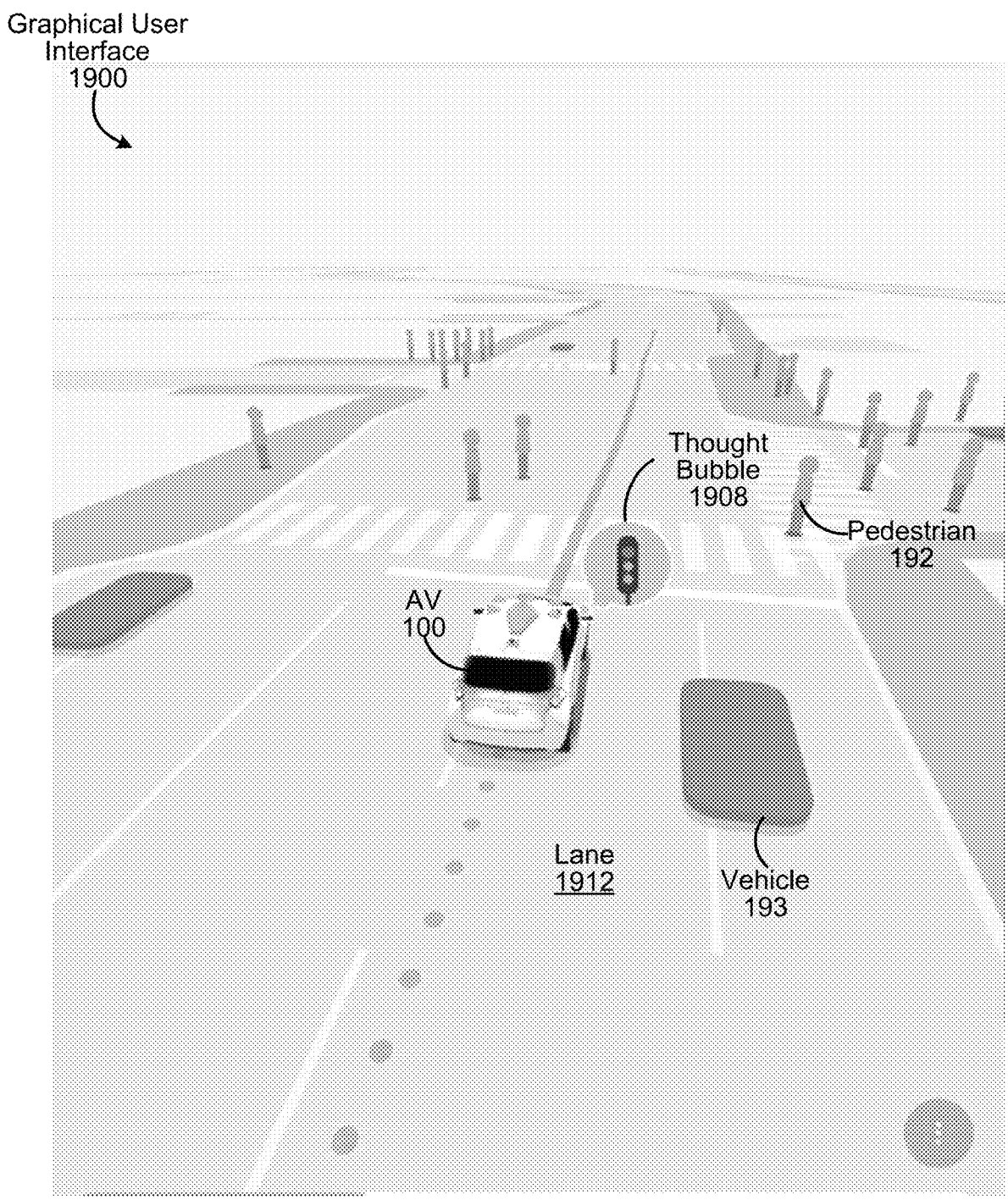
FIG. 19 illustrates a graphical user interface for alerting a passenger of a braking operation, in accordance with one or more embodiments.

FIG. 19 illustrates a graphical user interface 1900 for alerting a passenger of a braking operation, in accordance with one or more embodiments. The graphical user interface 1900 includes representations of the AV 100, a vehicle 193, a thought bubble 1908, a lane 1912, and a pedestrian 192.

The graphical user interface 1900 of FIG. 19 provides an advance warning to a passenger riding in the AV 100 that the AV 100 will perform a braking operation. The passenger can thus brace or prepare herself and the warning increases a level of passenger comfort. To provide the warning, the planning module 404 determines whether the AV 100 will perform a braking operation at a future time. The AV 100 may use its sensors 1304 to sense an object (e.g., a traffic light). For example, the perception module 402 may use the LiDARs of the AV 100 to sense the traffic light. The AV 100 uses the sensor data to determine that the traffic light is red or yellow and a braking operation is necessary to avoid violating a traffic rule.

In some embodiments, the perception module 402 determines that an object located within a threshold distance to the AV 100 is a traffic light based on sensor data. Object recognition, pattern matching, object classification, etc., may be used to make the determination from the sensor data.

The perception module 402 further determines whether a color of the traffic light is yellow or red based on the sensor data. For example, a camera of the AV 100 can be used to detect the color of the traffic light. The planning module 404 generates instructions for the braking operation by the control module 406 responsive to determining that the color of the traffic light is yellow or red. In other embodiments, a braking operation is performed to avoid a collision of the AV 100 with an object (e.g., pedestrian 192 or vehicle 193).

Responsive to determining that the AV 100 will perform the braking operation, the AV 100 generates the thought bubble 1908. The thought bubble 1908 displays a representation of a traffic light. The graphical user interface 1900 can be labeled with text, e.g., "Slowing down for pedestrian crossing the street" (e.g., for pedestrian 192) or "Changing lanes to avoid a vehicle" (e.g., for vehicle 193). In some embodiments, the thought bubble 1908 is displayed for objects that are less than a threshold distance from the AV 100. Thought bubbles for objects that are further away are not displayed to avoid confusing the passenger. The thought bubble 1908 can be used to increase passenger comfort. For example, if the thought bubble 1908 displays a message stating "We are about to brake in 15 seconds," the passenger can lean back in her seat, grab the door handles, or brace herself, etc.

The graphical user interface 1900 is transmitted to the display device 312 of the AV 100. In some embodiments, the graphical user interface 1900 includes a textual representation of a time duration after which the AV 100 will begin braking. The textual representation provides the passenger with information describing when or how soon the braking operation will occur. In other embodiments, operating constraints for the AV 100 are displayed on the display device 312. For example, the display device 312 can display a message or graphic stating that the vehicle 193 on the side of the AV 100 is too close and is causing the AV 100 to slow down and change lanes. The display device 312 can display a message or graphic stating the speed limit of the road or that the pedestrian 192 has jumped in front of the AV 100.

In some embodiments, the AV 100 retrieves passenger comfort preferences of a passenger riding in the AV 100 from a server 136 or a data storage unit 142 of the AV 100. The server 136 and data storage unit 142 are illustrated and described above with reference to FIG. 1. The passenger comfort preferences may specify that the passenger is to be alerted a certain time before braking or that the passenger prefers text to icons on the display device 312. The generating of the graphical user interface 1900 is performed by the AV 100 based on the passenger comfort preferences. In some embodiments, the graphical user interface 1900 includes a semantic computer icon (e.g., for pedestrian 192). The retrieved passenger comfort preferences can specify a size and a resolution of the semantic computer icon. In other embodiments, the AV 100 transmits the graphical user interface 1900 to the display device 312 responsive to receiving passenger comfort data using the one or more passenger sensors 1308 of the AV 100 indicating a particular level of passenger comfort. For example, the passenger may be notified of impending braking operations if she is uncomfortable.

Figure 20:
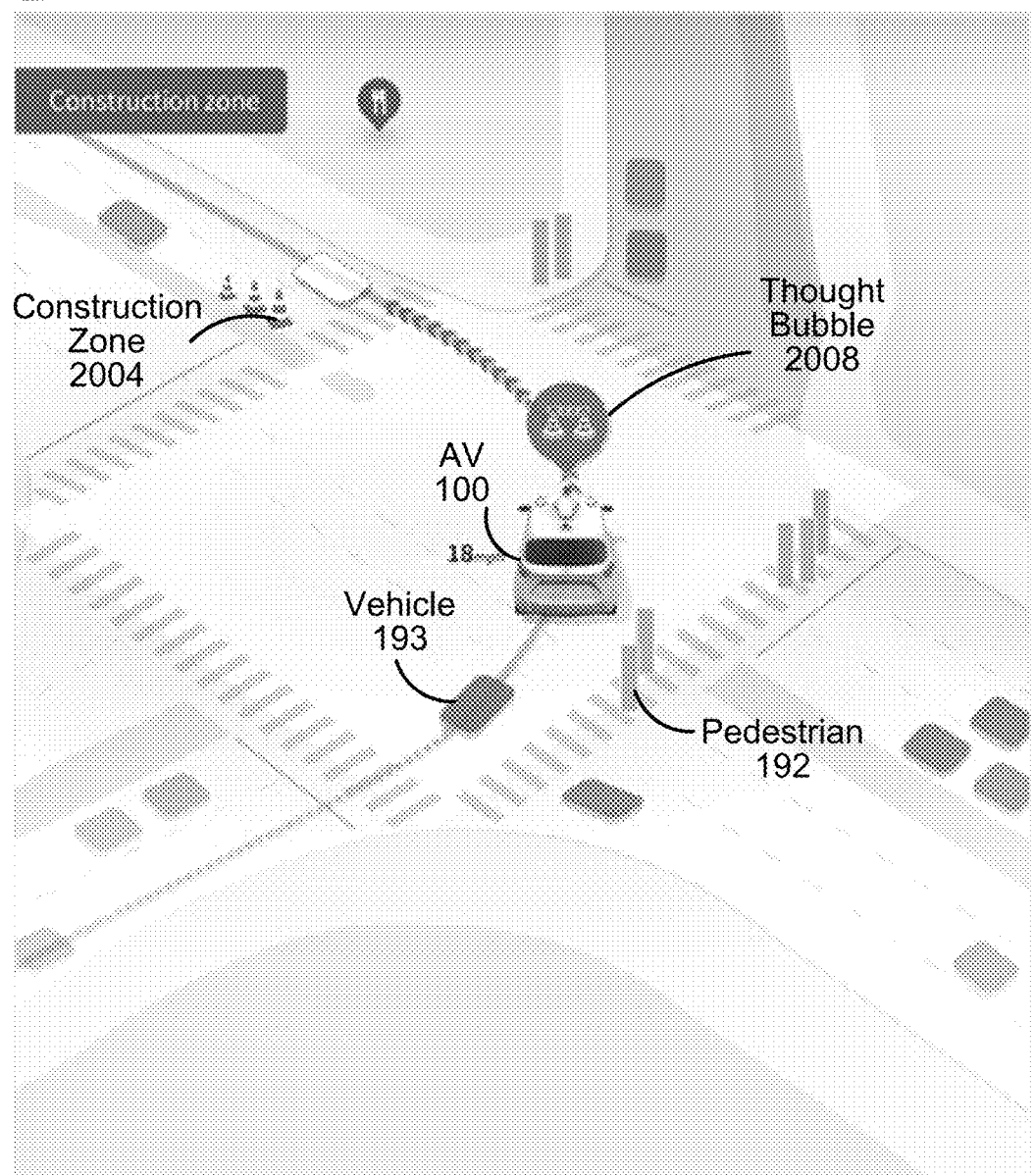
FIG. 20 illustrates a graphical user interface for displaying autonomous vehicle behaviors, in accordance with one or more embodiments.

FIG. 20 illustrates a graphical user interface 2000 for displaying autonomous vehicle behaviors, in accordance with one or more embodiments. The AV 100 is traveling through an intersection. A vehicle 193 and a pedestrian are behind the AV 100. The sensors 1304 of the AV 100 detect a construction zone 2004. The planning module 404 adjusts the trajectory of the AV 100 to avoid the construction zone 2004. The AV 100 updates the graphical user interface 2000 to include a thought bubble 2008. The thought bubble 2008 informs a passenger riding in the AV 100 that the AV 100 is adjusting its trajectory to avoid a construction zone.

Processes for Generating Graphical User Interfaces That Display AV Behaviors

Figure 21:
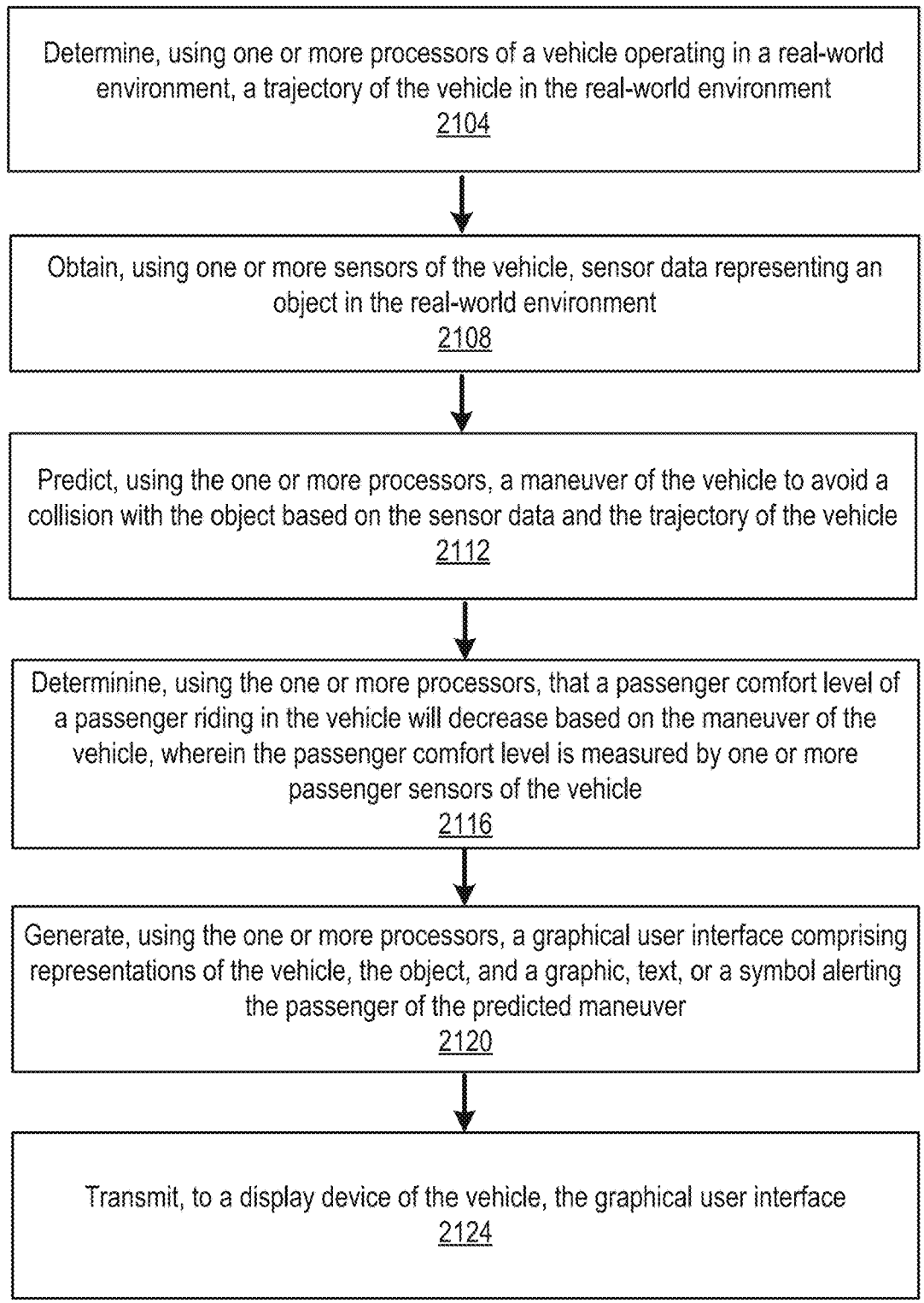

FIG. 21 illustrates a process 2100 for generating a graphical user interface that displays autonomous vehicle behaviors, in accordance with one or more embodiments. In some embodiments, the process 2100 of FIG. 21 is performed by the AV 100. Other entities, for example, the planning module 404 or the perception module 402 perform some or all of the steps of the process 2100 in other embodiments. Likewise, embodiments may include different and/or additional steps, or perform the steps in different orders.

The AV 100 determines 2104, using one or more processors, a trajectory of the AV 100 within the AV operating environment 1300. For example, a shortest-path algorithm or a weighted optimization algorithm can be used to determine the trajectory.

The AV 100 obtains 2018, using one or more sensors 1304 sensor data representing an object 1008 in the AV operating environment 1300. The sensor data may be 2D or 3D, e.g., 2D camera images or 3D LiDAR data. Objects that are within a threshold distance to the AV 100 are classified. The object 1008 can be a vehicle or pedestrian.

The AV 100 predicts 2112, using the one or more processors, a maneuver of the AV 100 to avoid a collision with the object 1008 based on the sensor data and the trajectory of the AV 100. For example, the AV 100 may determine a point and time in the future when its trajectory intersects with a trajectory of the object 1008.

The AV 100 determines 2116, using the one or more processors that a passenger comfort level of a passenger riding in the vehicle will decrease based on the maneuver of the AV 100. The passenger comfort level is measured by one or more passenger sensors 1308 of the AV 100. The AV 100 makes the determination that the passenger comfort level will decrease based at least in part on stored passenger comfort data.

The AV 100 generates 2120 a graphical user interface including representations of the AV 100, the object 1008, and a graphic, text, or a symbol alerting the passenger of the predicted maneuver. The graphical user interface can include a representation of the road structure including lanes, stop signs, traffic lights, construction zones, etc. The graphical user interface may include thought bubbles that represent the behavior of the AV 100, e.g., "Slowing down for a pedestrian crossing the street," "Changing lanes," etc. The thought bubbles may represent objects that are less than a threshold distance from the AV 100. The graphical user interface may include operating constraints for the AV 100, such as to avoid hitting a vehicle 193 in front of the AV 100 that is causing the planning module 404 to reduce the speed of the AV 100 or a pedestrian 192 who has suddenly jumped in front of the AV 100.

The AV 100 transmits 2124 the graphical user interface to a display device 312. The display device 312 provides data to a passenger riding in the AV 100. The data includes the graphical user interface and may include a map, passenger comfort settings, or operational metrics such as speed or acceleration.

FIG. 22 illustrates a process 2200 for generating a graphical user interface that displays autonomous vehicle behaviors, in accordance with one or more embodiments. In some embodiments, the process 2200 of FIG. 22 is performed by the AV 100. Other entities, for example, the planning module 404 or the perception module 402 perform some or all of the steps of the process 2200 in other embodiments. Likewise, embodiments may include different and/or additional steps, or perform the steps in different orders.

The AV 100 identifies 2204, using one or more processors, an object 1008 based on sensor data received from one or more sensors 1304 of the AV 100. The sensors 1304 sense a state of the environment 1300, such as the presence and structure of the object 1008.

The AV 100 generates 2208, using the one or more processors, a graphical user interface including representations of the AV 100 and the object 1008. In some embodiments, the AV 100 generates a geometric model or icon of the object 1008 for display. For example, the geometric model may be a geometric shape such as a rectangle, oval, square, circle, or another type of shape. The geometric model or icon may include a thought bubble to represent behavior of the object 1008.

The AV 100 determines 2212, using the one or more processors, that a probability of collision of the AV 100 with the object 1008 is greater than a threshold.

The AV 100 determines 2216, using the one or more processors, an operating constraint for the AV 100 to avoid the collision of the AV 100 with the object 1008. The operating constraint may include a maximum speed of the AV 100, a change of lanes for the AV 100, a minimum distance from the object 1008, etc.

The AV 100 updates 2220, using the one or more processors, the graphical user interface to display the operating constraint. There may be several operating constraints listed in order of importance. The operating constraint that is most constraining the behavior of the AV 100 may be labeled in bold. For example, a label may display "Slowing down to 5 mph to avoid a pedestrian" or "Changing lanes to the left to avoid traffic in the right lane" on the graphical user interface. A label may include an icon portraying a braking operation.

The AV 100 transmits 2224 the labeled graphical user interface to the display device 312 of the AV 100.

FIG. 23 illustrates a process 2300 for generating a graphical user interface that displays autonomous vehicle behaviors, in accordance with one or more embodiments. In some embodiments, the process 2300 of FIG. 23 is performed by the AV 100. Other entities, for example, the planning module 404 or the perception module 402 perform some or all of the steps of the process 2300 in other embodiments. Likewise, embodiments may include different and/or additional steps, or perform the steps in different orders.

The AV 100 generates 2304, at a first time t1, a graphical user interface including geometric models of the AV 100 and an object 1008. The object 1008 is located at a first distance d1 to the AV 100. The AV 100 uses its sensors 1304 to sense at time t1 that the object 1008 (e.g., a vehicle, a pedestrian, a construction zone, etc.) is at the distance d1 from the AV 100. For example, LiDAR sensors can be used to determine the distance d1 based on the time it takes for LiDAR beams emitted by the AV 100 towards the object 1008 to return to the AV 100.

The AV 100 determines 2308 that the object 1008 is located at a second distance d2 from the AV 100 at a second time t2. The second time t2 is after the first time t1. The second distance d2 is smaller than the first distance d1. Therefore, the AV 100 determines that the ASV 100 and the object 1008 are approaching each other.

The AV 100 determines 2312, using one or more processors, a vehicular maneuver to avoid a collision with the object 1008. For example, the AV 100 may stop, increase speed to get away, slow down, or change lanes. In some embodiments, determining the vehicular maneuver includes generating a trajectory 198 for the AV 100. The trajectory 198 is based on a directed graph representation of the environment 1300 and the object 1008. An example of such a directed graph 1000 is illustrated and described above with reference to FIG. 10.

The AV 100 updates 2316, using the one or more processors, the graphical user interface such that the updated graphical user interface displays a trajectory of the AV 100 corresponding to the vehicular maneuver. For example, a representation of the vehicular maneuver can include arrows showing a new trajectory for the AV 100, symbols representing an accelerating operation, or text representing a lane change.

The AV 100 transmits 2320 the updated graphical user interface to the display device 312. The updated graphical user interface includes the vehicular maneuver of the AV 100 to provide information and a sense of control to a passenger riding in the AV 100 and increase trust in the AV 100.

FIG. 24 illustrates a process 2400 for generating a graphical user interface that displays autonomous vehicle behaviors, in accordance with one or more embodiments. In some embodiments, the process 2400 of FIG. 24 is performed by the AV 100. Other entities, for example, the planning module 404 or the perception module 402 perform some or all of the steps of the process 2400 in other embodiments. Likewise, embodiments may include different and/or additional steps, or perform the steps in different orders.

The AV 100 displays 2404, on a display device 312 of the AV 100, a graphical user interface. The graphical user interface includes representations of the AV 100 and the AV operating environment 1300.

The AV 100 determines 2408, using one or more processors, whether the AV 100 will perform a braking operation at a first time t1. The braking operation may be performed to avoid a collision of the AV 100 with an object 1008, to obey a traffic rule such as for a traffic light, or because the AV 100 has arrived at a destination requested by a passenger riding in the AV 100. The planning module 404 determines whether the braking operation will be performed based on visual sensor data received from the sensors 1304.

Responsive to determining that the AV 100 will perform the braking operation at the first time t1, the AV 100 determines 2412, using one or more passenger sensors 1308, whether one or more passengers are riding in the AV 100. For example, weight sensors can be used.

Responsive to determining that the one or more passengers are riding in the AV 100, the AV 100 transmits 2416 audio output at a second time t2 before the first time t1. The audio output is transmitted using the smart speaker 1316. The audio output informs the passengers that the AV 100 will perform the braking operation at the first time t1.

The AV 100 displays, on the display device 312, an update to the graphical user interface. The update includes a representation (e.g., text or a thought bubble) of the braking operation.

ADDITIONAL EMBODIMENTS

In an embodiment, one or more processors of a vehicle operating in a real-world environment determine a trajectory of the vehicle in the real-world environment. One or more sensors of the vehicle obtain sensor data representing an object in the real-world environment. The one or more processors predict a maneuver of the vehicle to avoid a collision with the object based on the sensor data and the trajectory of the vehicle. The one or more processors determine that a passenger comfort level of a passenger riding in the vehicle will decrease based on the maneuver of the vehicle. The passenger comfort level is measured by one or more passenger sensors of the vehicle. The one or more processors generate a graphical user interface including representations of the vehicle, the object, and a graphic, text, or a symbol alerting the passenger of the predicted maneuver. The graphical user interface is transmitted to a display device of the vehicle.

In an embodiment, the generating of the graphical user interface is performed at a first time and the transmitting of the graphical user interface is performed at a second time. A time difference is increased between the first time and the second time based on an operating speed of the vehicle.

In an embodiment, the one or more sensors obtain second sensor data after the obtaining of the sensor data representing the object. A mismatch is identified between the second sensor data and the sensor data. It is determined that the mismatch is associated with the object.

In an embodiment, the one or more processors remove a portion of the sensor data associated with the mismatch prior to the generating of the graphical user interface.

In an embodiment, the determining that the passenger comfort level of the passenger riding in the vehicle will decrease is based at least in part on stored passenger comfort data.

In an embodiment, the maneuver of the vehicle includes at least one of braking, changing a lane, or swerving.

In an embodiment, the decrease in the passenger comfort level includes an increase in a blood pressure of the passenger measured by the one or more passenger sensors.

In an embodiment, the decrease in the passenger comfort level comprises an increase in a pulse rate of the passenger measured by the one or more passenger sensors.

In an embodiment, the decrease in the passenger comfort level includes an increase in a pupil dilation of the passenger measured by the one or more passenger sensors.

In an embodiment, the input device is a smart speaker and the passenger input is a voice command.

In an embodiment, the smart speaker transmits audio output describing the maneuver of the vehicle responsive to receiving the voice command.

In an embodiment, the smart speaker transmits audio output describing the trajectory of the object in the real-world environment responsive to receiving the voice command.

In an embodiment, one or more processors of a vehicle operating in a real-world environment identify an object based on sensor data received from one or more sensors of the vehicle. The one or more processors generate a graphical user interface comprising representations of the vehicle and the object. The one or more processors determine that a probability of collision of the vehicle with the object is greater than a threshold value. The one or more processors determine an operating constraint for the vehicle to avoid the collision of the vehicle with the object. The one or more processors update the graphical user interface to display the operating constraint. The updated graphical user interface is transmitted to a display device of the vehicle.

In an embodiment, a smart speaker of the vehicle receives a voice command from a passenger riding in the vehicle. The voice command is directed to the graphical user interface.

In an embodiment, the one or more processors generate audio output describing the object.

In an embodiment, the one or more processors generate audio output describing the operating constraint for the vehicle.

In an embodiment, the smart speaker transmits the audio output to the passenger.

In an embodiment, the sensor data includes three-dimensional LiDAR data or camera images.

In an embodiment, the representations of the vehicle and the object include geometric models of the vehicle and the object.

In an embodiment, text is located within at least one of the geometric models.

In an embodiment, the display device is a mobile device.

In an embodiment, the display device is a tablet.

In an embodiment, the display device is a laptop.

In an embodiment, the display device is attached to an interior surface of the vehicle.

In an embodiment, the operating constraint includes a maximum operating speed.

In an embodiment, the operating constraint includes a minimum operating speed.

In an embodiment, the operating constraint includes a maximum acceleration.

In an embodiment, the operating constraint includes a minimum acceleration.

In an embodiment, the operating constraint specifies a lane of the road for the vehicle to operate in.

In an embodiment, a size of the representation of the object decreases within the graphical user interface as the probability of collision of the vehicle with the object decreases.

In an embodiment, the updating of the graphical user interface to display the operating includes adding text describing the operating constraint to the graphical user interface.

In an embodiment, the updating of the graphical user interface to display the operating includes adding a graph describing the operating constraint to the graphical user interface.

In an embodiment, the updating of the graphical user interface to display the operating comprises adding a symbol describing the operating constraint to the graphical user interface.

In an embodiment, the updating of the graphical user interface to display the operating includes adding an image describing the operating constraint to the graphical user interface.

In an embodiment, at a first time, a graphical user interface is generated including geometric models of a vehicle and an object located at a first distance from the vehicle. At a second time, it is determined that the object is located at a second distance from the vehicle. The second time is after the first time and the second distance is smaller than the first distance. One or more processors of the vehicle determine a vehicular maneuver for the vehicle to avoid a collision with the object. The one or more processors update the graphical user interface such that the updated graphical user interface displays a trajectory of the vehicle corresponding to the vehicular maneuver. The updated graphical user interface including the trajectory of the vehicle is transmitted to a display device of the vehicle.

In an embodiment, one or more sensors of the vehicle receive sensor data representing the object at the second time.

In an embodiment, the one or more processors determine the second distance based on the sensor data received at the second time.

In an embodiment, the vehicular maneuver includes altering, using a control module of the vehicle, an operating speed of the vehicle.

In an embodiment, the vehicular maneuver includes altering, using a control module of the vehicle, an acceleration of the vehicle.

In an embodiment, the vehicular maneuver includes altering, using a control module of the vehicle, a lane in which the vehicle is operating.

In an embodiment, the one or more processors determine a time difference between the first time and the second time.

In an embodiment, the one or more processors determine a distance difference between the first distance and the second distance.

In an embodiment, the one or more processors determine a probability of collision of the vehicle with the object based on the time difference and the distance difference.

In an embodiment, the display device receives passenger input directed to the object. A smart speaker of the vehicle receives a voice command directed to the object.

In an embodiment, the geometric models include computer-executable semantic icons.

In an embodiment, at least one of the computer-executable semantic icons receive passenger input directed to the vehicle or the object.

In an embodiment, responsive to receiving the passenger input, on the display device text is displayed representing the first time and the first distance; or the second time and the second distance.

In an embodiment, the displaying of the trajectory includes transmitting, to the display device, one or more animated icons representing the vehicular maneuver.

In an embodiment, the updating of the graphical user interface includes displaying a thought bubble representing the vehicular maneuver.

In an embodiment, one or more passenger sensors of the vehicle receive passenger comfort data for a passenger riding in the vehicle. The one or more processors determine that a passenger comfort level has decreased responsive to the transmitting of the updated graphical user interface to the display device. The one or more processors terminate the transmitting of the updated graphical user interface to the display device.

In an embodiment, the vehicular maneuver includes adjusting a trajectory of the vehicle such that a third distance of the vehicle from the object is increased at a third time after the second time.

In an embodiment, a graphical user interface comprising representations of the vehicle and the real-world environment is displayed on a display device of a vehicle operating in a real-world environment. One or more processors of the vehicle determine whether the vehicle will perform a braking operation at a first time. Responsive to determining that the vehicle will perform the braking operation at the first time, one or more passenger sensors of the vehicle determine whether one or more passengers are riding in the vehicle. Responsive to determining that the one or more passengers are riding in the vehicle, a smart speaker transmits, at a second time before the first time, audio output informing the one or more passengers that the vehicle will perform the braking operation at the first time. An update to the graphical user interface is displayed on the display device. The update includes a representation of a time difference between the second time and the first time.

In an embodiment, the vehicle performs the braking operation to avoid a collision of the vehicle with an object located in the real-world environment.

In an embodiment, the vehicle performs the braking operation to obey a traffic rule.

In an embodiment, one or more actuators located within the vehicle are vibrated. The vibration of the one or more actuators is indicative of the braking operation.

In an embodiment, the one or more processors determine a spatiotemporal location of the vehicle based on odometry data received from one or more sensors of the vehicle.

In an embodiment, the one or more processors determine a spatiotemporal location of the object relative to the vehicle based on sensor data received from the one or more sensors.

In an embodiment, the audio output includes an instruction to the one or more passengers to grasp an armrest of the vehicle prior to the vehicle performing the braking operation at the first time.

In an embodiment, the audio output includes an instruction to the one or more passengers to prepare for the braking operation prior to the vehicle performing the braking operation at the first time.

In an embodiment, the one or more processors determine that an object located within a threshold distance to the vehicle is a traffic light based on the sensor data received from the one or more sensors.

In an embodiment, the one or more processors determine whether a color of the traffic light is red or yellow based on the sensor data received from the one or more sensors.

In an embodiment, the braking operation is performed responsive to determining that the color of the traffic light is red or yellow.

In an embodiment, the update further comprises a thought bubble displaying a representation of the object.

In an embodiment, passenger comfort preferences of the one or more passengers riding in the vehicle are retrieved.

In an embodiment, the transmitting of the audio output is performed based on the passenger comfort preferences.

In an embodiment, the representations of the vehicle and the real-world environment include at least one semantic computer icon.

In an embodiment, the passenger comfort preferences specify a size and a resolution of the at least one semantic computer icon.

In an embodiment, the time difference between the first time and the second time is determined.

In an embodiment, the transmitting of the audio output informing the one or more passengers that the vehicle will perform the braking operation at the first time is performed responsive to the time difference falling below a threshold.

In an embodiment, the displaying of the update to the graphical user interface is performed responsive to the time difference falling below a threshold.

Among the benefits and advantages of the embodiments disclosed herein are that trust of the passengers and the public in AVs is increased with respect to different and complex self-driving scenarios in a safe and cost-effective manner. The embodiments promote confidence, a sense of control, and a sense of safety for people riding in the AVs. The embodiments provide comprehensive sensing, clear communication, response to changes, and multiple modes of interaction. The active safety features (e.g., collision avoidance) and infotainment systems are combined into a unified system architecture. The embodiments links the autonomous functionality of the AVs with visual, audible, and haptic communication with passengers to increase a level of trust. The increased trust in the AVs results in increased passenger and pedestrian safety, lower wear and tear on the AV, reduced travel time, a reduced travel distance, etc. Increased safety for other vehicles on the road network is also achieved.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    measuring, using one or more biometric sensors, passenger comfort level of a passenger riding in a vehicle;
    determining, using one or more processors of the vehicle operating in a real-world environment, a trajectory of the vehicle in the real-world environment;
    obtaining, using one or more sensors of the vehicle, sensor data representing an object in the real-world environment;
    predicting, using the one or more processors, a maneuver of the vehicle to avoid a collision with the object based on the sensor data and the trajectory of the vehicle;
    determining that the passenger comfort level will decrease by performing the maneuver;
    generating, using the one or more processors, a graphical user interface comprising representations of the vehicle, the object, and a graphic, text, or a symbol alerting a passenger riding in the vehicle of the predicted maneuver, wherein a size or presence of at least one of the representations is based on the passenger comfort level that was measured by at least one of the one or more sensors of the vehicle and the determination that the passenger comfort level will decrease by performing the maneuver; and
    transmitting, to a display device in the vehicle, the graphical user interface.

2. The method of claim 1, further comprising receiving, using an input device of the vehicle, passenger input directed to the object, wherein the object is a dynamic object.

3. The method of claim 2, further comprising increasing, within the graphical user interface, a size of the object responsive to receiving the passenger input.

4. The method of claim 2, further comprising increasing, within the graphical user interface, a display resolution of the object responsive to receiving the passenger input.

5. The method of claim 2, further comprising determining, using the one or more processors, a trajectory of the object in the real-world environment responsive to receiving the passenger input.

6. The method of claim 5, further comprising displaying the trajectory of the object within the graphical user interface.

7. The method of claim 1, further comprising obtaining, using the one or more sensors, second sensor data after the obtaining of the sensor data representing the object.

8. The method of claim 7, wherein the predicting of the maneuver of the vehicle to avoid the collision with the object is performed responsive to the second sensor data matching the sensor data.

9. The method of claim 1, further comprising determining, using the one or more processors, a level of confidence associated with the generating of the graphical user interface displaying a representation of the object.

10. The method of claim 9, wherein the transmitting of the graphical user interface is performed responsive to the level of confidence exceeding a threshold value.

11. The method of claim 1, wherein the generating of the graphical user interface comprises generating, using the one or more processors, a geometric model of the object based on the sensor data.

12. The method of claim 1, further comprising filtering, using digital signal processing, the sensor data to remove noise from the sensor data.

13. The method of claim 12, wherein the generating of the graphical user interface is performed based on the filtered sensor data.

14. The method of claim 12, wherein the predicting of the maneuver of the vehicle to avoid a collision with the object is performed based on the filtered sensor data.

15. The method of claim 1, wherein the predicting of the maneuver of the vehicle to avoid a collision with the object is performed responsive to the object being located within a threshold distance from the vehicle.

16. The method of claim 1, wherein the object comprises a second vehicle or a pedestrian.

17. The method of claim 1, wherein the graphical user interface further displays a three-dimensional (3D) representation of at least one of a lane, a traffic light, a traffic sign, or a construction zone.

18. The method of claim 1, wherein the generating of the graphical user interface is performed at a first time and the transmitting of the graphical user interface is performed at a second time.

19. A non-transitory computer readable storage medium storing instructions executable by one or more computer processors, the instructions when executed by the one or more computer processors cause the one or more computer processors to:
measuring, using one or more biometric sensors, passenger comfort level of a passenger riding in a vehicle;
determine a trajectory of a vehicle operating in a real-world environment;
obtain, using one or more sensors of the vehicle, sensor data representing an object in the real-world environment;
predict a maneuver of the vehicle to avoid a collision with the object based on the sensor data and the trajectory of the vehicle;
determine that the passenger comfort level will decrease by performing the maneuver;
generate a graphical user interface comprising representations of the vehicle, the object, and a graphic, text, or a symbol alerting a passenger riding in the vehicle of the predicted maneuver, wherein a size or presence of at least one of the representations is based on the passenger comfort level that was measured by at least one of the one or more sensors of the vehicle and the determination that the passenger comfort level will decrease by performing the maneuver; and
transmit, to a display device of in vehicle, the graphical user interface.

20. A vehicle comprising:
one or more computer processors; and
a non-transitory computer readable storage medium storing instructions executable by one or more computer processors, the instructions when executed by the one or more computer processors cause the one or more computer processors to:
measure, using one or more biometric sensors, passenger comfort level of a passenger riding in a vehicle;
determine a trajectory of a vehicle operating in a real-world environment;
obtain, using one or more sensors of the vehicle, sensor data representing an object in the real-world environment;
predict a maneuver of the vehicle to avoid a collision with the object based on the sensor data and the trajectory of the vehicle;
determining that the passenger comfort level will decrease by performing the maneuver;
generate a graphical user interface comprising representations of the vehicle, the object, and a graphic, text, or a symbol alerting a passenger riding in the vehicle of the predicted maneuver, wherein a size or presence of at least one of the representations is based on the passenger comfort level that was measured by at least one of the one or more sensors of the vehicle and the determination that the passenger comfort level will decrease by performing the maneuver; and
transmit, to a display device in the vehicle, the graphical user interface.

21. The method of claim 1, further comprising:
identifying, using the one or more processors based on at least one measurement by the one or more biometric sensors of the vehicle, the passenger comfort level; and
determining, using the one or more processors based on the passenger comfort level, not to display the representation of the at least one of the vehicle, the object, and the graphic, text, or symbol.

22. The method of claim 1, further comprising:
identifying, using the one or more processors based on at least one measurement by the one or more biometric sensors of the vehicle, the passenger comfort level; and
determining, using the one or more processors based on the measured passenger comfort level, a size of the graphic, text, or symbol.

* * * * *